(12) United States Patent
Cao et al.

(10) Patent No.: US 12,193,021 B2
(45) Date of Patent: Jan. 7, 2025

(54) ACCESS NETWORK AND SIDELINK JOINT SCHEDULING

(71) Applicant: Qualcomm Incorporated, San Diego, CA (US)

(72) Inventors: Yiqing Cao, Beijing (CN); Wanshi Chen, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/641,526

(22) PCT Filed: Sep. 10, 2020

(86) PCT No.: PCT/CN2020/114506
§ 371 (c)(1),
(2) Date: Mar. 9, 2022

(87) PCT Pub. No.: WO2021/047589
PCT Pub. Date: Mar. 18, 2021

(65) Prior Publication Data
US 2022/0338232 A1    Oct. 20, 2022

(30) Foreign Application Priority Data

Sep. 10, 2019 (WO) ................ PCT/CN2019/105051

(51) Int. Cl.
*H04W 72/23* (2023.01)
*H04W 72/1263* (2023.01)

(52) U.S. Cl.
CPC ....... *H04W 72/23* (2023.01); *H04W 72/1263* (2013.01)

(58) Field of Classification Search
CPC .......................... H04W 72/23; H04W 72/1263
See application file for complete search history.

(56) References Cited

U.S. PATENT DOCUMENTS

| | | | |
|---|---|---|---|
| 2012/0129540 A1 | 5/2012 | Hakola et al. | |
| 2016/0234754 A1* | 8/2016 | Baghel | H04W 72/51 |

(Continued)

FOREIGN PATENT DOCUMENTS

| | | |
|---|---|---|
| CN | 109479297 A | 3/2019 |
| WO | WO-2019051803 A1 | 3/2019 |

OTHER PUBLICATIONS

Supplementary European Search Report—EP20863689—Search Authority—The Hague—Aug. 4, 2023.

(Continued)

*Primary Examiner* — Elton Williams
(74) *Attorney, Agent, or Firm* — Holland & Hart LLP/Qualcomm

(57) ABSTRACT

Methods, systems, and devices for wireless communications are described. A user equipment (UE) may receive at least one control message from a base station, the at least one message jointly scheduling the UE for access network communications between the UE and the base station and for sidelink communications between the UE and another UE, such as another UE in a group of UEs. The UE may determine network control information based on the at least one control message. The UE may also determine sidelink control information based on the at least one control message. The UE may communicate with the base station and the other UE in accordance with the network control information and the sidelink control information, respectively.

30 Claims, 17 Drawing Sheets

(56) References Cited

U.S. PATENT DOCUMENTS

| | | |
|---|---|---|
| 2018/0295646 A1 | 10/2018 | Faurie et al. |
| 2019/0082459 A1 | 3/2019 | Faurie et al. |
| 2022/0217697 A1* | 7/2022 | Lee .................. H04W 72/20 |

OTHER PUBLICATIONS

ZTE: "Study on D2D Communication", 3GPP TSG-RAN WG1 Meeting #74, R1-133148, 3rd Generation Partnership Project, Mobile Competence Centre, 650, Route Des Lucioles, F-06921 Sophia-Antipolis Cedex, France, vol. RAN WG1, No. Barcelona, Spain, Aug. 19, 2013-Aug. 23, 2013, Aug. 10, 2013, XP050716360, 9 Pages, paragraph [0003].

Taiwan Search Report—TW109131088—TIPO—Nov. 8, 2023.

Ericsson: "Considerations and Design Principles for NR Sidelink," 3GPP TSG-RAN WG1 Meeting #94, R1-1809306, Aug. 20-24, 2018 (Aug. 24, 2018), the whole document, 4 pages.

International Search Report and Written Opinion—PCT/CN2020/114506—ISA/EPO—Nov. 30, 2020.

International Search Report and Written Opinion—PCT/CN2019/105051—ISA/EPO—Jun. 4, 2020.

\* cited by examiner

ACCESS NETWORK AND SIDELINK JOINT SCHEDULING

CROSS REFERENCES TO RELATED APPLICATIONS

The present application is a 371 national stage filing of International PCT Application No. PCT/CN2020/114506 by Cao et al., entitled "ACCESS NETWORK AND SIDELINK JOINT SCHEDULING," filed Sep. 10, 2020; and claims priority to International Patent Application No. PCT/CN2019/105051 by Cao et al., entitled "ACCESS NETWORK AND SIDELINK JOINT SCHEDULING," filed Sep. 10, 2019, each of which is assigned to the assignee hereof, and each of which is expressly incorporated by reference in its entirety herein.

FIELD OF TECHNOLOGY

The following relates generally to wireless communications and more specifically to access network and sidelink joint scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support access links or sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs (e.g., multiple devices in a device-to-device (D2D) system, multiple devices and/or vehicles in a vehicle-to-everything (V2X) system or a vehicle-to-vehicle (V2V) system, among other examples of systems that may support sidelink communications). However, conventional wireless communication systems may have separated configurations for access links and sidelinks, which may result in inefficient communications.

SUMMARY

The described techniques relate to improved methods, systems, devices, and apparatuses that support access network and sidelink joint scheduling. Generally, the described techniques may enable a base station to jointly configure a user equipment (UE) or a group of UEs for communications on both an access network and a sidelink network, which may result in more efficient communications, improved latency, and power saving enhancements, among other advantages. For example, the base station may jointly schedule a UE with resources for both access links and sidelinks using control signaling. The control signaling may include one or more messages to schedule and/or configure the UE for both access network communications and sidelink communications. In some examples, the one or more messages may include a sidelink grant and/or an indication of a sidelink grant, a downlink or an uplink grant, or any combination thereof. For example, the one or more messages may include a downlink control information (DCI) message corresponding to a downlink grant and a sidelink grant, an uplink grant and a sidelink grant, a downlink grant and an indication of a sidelink grant, etc. Additionally or alternatively, the one or more messages may include a radio resource control (RRC) message corresponding to a sidelink grant (e.g., indicated by the DCI message).

A method of wireless communications at a first UE is described. The method may include receiving at least one control message from a base station, the at least one control message jointly scheduling the first UE for access network communications between the first UE and the base station and for sidelink communications between the first UE and at least a second UE, determining network control information associated with the access network communications based on the at least one control message, determining sidelink control information associated with the sidelink communications based on the at least one control message, and communicating with the base station and the second UE in accordance with the network control information and the sidelink control information, respectively.

An apparatus for wireless communications at a first UE is described. The apparatus may include a processor, memory coupled with the processor, and instructions stored in the memory. The instructions may be executable by the processor to cause the apparatus to receive at least one control message from a base station, the at least one control message jointly scheduling the first UE for access network communications between the first UE and the base station and for sidelink communications between the first UE and at least a second UE, determine network control information associated with the access network communications based on the at least one control message, determine sidelink control information associated with the sidelink communications based on the at least one control message, and communicate with the base station and the second UE in accordance with the network control information and the sidelink control information, respectively.

Another apparatus for wireless communications at a first UE is described. The apparatus may include means for receiving at least one control message from a base station, the at least one control message jointly scheduling the first UE for access network communications between the first UE and the base station and for sidelink communications between the first UE and at least a second UE, determining network control information associated with the access network communications based on the at least one control message, determining sidelink control information associated with the sidelink communications based on the at least one control message, and communicating with the base station and the second UE in accordance with the network control information and the sidelink control information, respectively.

A non-transitory computer-readable medium storing code for wireless communications at a first UE is described. The code may include instructions executable by a processor to receive at least one control message from a base station, the at least one control message jointly scheduling the first UE for access network communications between the first UE and the base station and for sidelink communications between the first UE and at least a second UE, determine network control information associated with the access network communications based on the at least one control message, determine sidelink control information associated with the sidelink communications based on the at least one control message, and communicate with the base station and the second UE in accordance with the network control information and the sidelink control information, respectively.

In some examples of the method, apparatuses, and non-transitory computer-readable medium described herein, determining the sidelink control information may include operations, features, means, or instructions for receiving the sidelink control information and the network control information in separate but linked messages.

In some examples of the method, apparatuses, and non-transitory computer-readable medium described herein, determining the sidelink control information may include operations, features, means, or instructions for receiving the sidelink control information and the network control information in a same control message.

In some examples of the method, apparatuses, and non-transitory computer-readable medium described herein, receiving the at least one control message further may include operations, features, means, or instructions for receiving a first control message from the base station, the first control message including the network control information and an indication that the sidelink control information may be to be received via a second message, and receiving the second message from the base station, the second message including the sidelink control information.

In some examples of the method, apparatuses, and non-transitory computer-readable medium described herein, the first control message includes DCI associated with a downlink grant for the first UE and the second message includes an RRC message associated with a sidelink grant for the first UE and piggybacked on a data message scheduled by the DCI.

In some examples of the method, apparatuses, and non-transitory computer-readable medium described herein, receiving the second message from the base station may include operations, features, means, or instructions for receiving an indication of one or more resources associated with the sidelink communications, the one or more resources including a sidelink control channel, a sidelink shared channel, a feedback channel, or any combination thereof.

In some examples of the method, apparatuses, and non-transitory computer-readable medium described herein, the feedback channel may be associated with uplink feedback, the uplink feedback including automatic repeat request (ARQ) communications with the base station, channel state indicator (CSI) report transmissions to the base station, or a combination thereof, where the uplink feedback may be coded based on uplink control information received from the base station.

In some examples of the method, apparatuses, and non-transitory computer-readable medium described herein, a first resource of the one or more resources includes resources for both the sidelink control channel and the sidelink shared channel.

In some examples of the method, apparatuses, and non-transitory computer-readable medium described herein, a first resource of the one or more resources includes resources for the sidelink control channel and a second resource of the one or more resource includes resources for the sidelink shared channel.

Some examples of the method, apparatuses, and non-transitory computer-readable medium described herein may further include operations, features, means, or instructions for receiving an indication of a resource assigned to the feedback channel, a resource pool configured for the feedback channel, or a combination thereof.

In some examples of the method, apparatuses, and non-transitory computer-readable medium described herein, receiving the at least one control message further may include operations, features, means, or instructions for receiving a first control message from the base station, the first control message including the network control information and the sidelink control information.

In some examples of the method, apparatuses, and non-transitory computer-readable medium described herein, first control message includes DCI associated with an integrated grant for the first UE, the integrated grant including one or more fields corresponding to a sidelink grant and a downlink grant or an uplink grant.

In some examples of the method, apparatuses, and non-transitory computer-readable medium described herein, the first control message includes an indication that the integrated grant may be included in the DCI.

In some examples of the method, apparatuses, and non-transitory computer-readable medium described herein, the first control message includes an indication of one or more bandwidth parts (BWPs) for the access network communications, the sidelink communications, or both.

Some examples of the method, apparatuses, and non-transitory computer-readable medium described herein may further include operations, features, means, or instructions for determining one or more sidelink resources for the sidelink communications based on the received sidelink control information, the one or more sidelink resources including a transmission resource, a reception resource, or both.

In some examples of the method, apparatuses, and non-transitory computer-readable medium described herein, the one or more sidelink resources include a resource pool for the sidelink communications.

In some examples of the method, apparatuses, and non-transitory computer-readable medium described herein, the one or more sidelink resources may be assigned to the first UE for the sidelink communications.

In some examples of the method, apparatuses, and non-transitory computer-readable medium described herein, the sidelink control information includes one or more sidelink parameters for the sidelink communications between the first UE and the second UE, the one or more sidelink parameters including a transmission power parameter, a modulation coding scheme (MCS), a new data indicator (NDI), hybrid ARQ (HARQ) parameters, a downlink assignment indicator (DAI), a resource assignment expiration timer, or a combination thereof.

In some examples of the method, apparatuses, and non-transitory computer-readable medium described herein, the sidelink control information includes a group identifier of a group of UEs including the first UE and the second UE, a sidelink radio network temporary identifier (RNTI) for groupcast communications within the group of UEs, or a combination thereof.

Some examples of the method, apparatuses, and non-transitory computer-readable medium described herein may further include operations, features, means, or instructions for identifying an RNTI corresponding to a first control message of the at least one control message, where the first control message includes DCI and the RNTI may be associated with joint scheduling of access network communications and sidelink communications, and descrambling a cyclic redundancy check (CRC) code of the first control message based on the identified RNTI.

A method of wireless communications at a base station is described. The method may include identifying network control information associated with access network communications between the base station and a first UE, identifying sidelink control information associated with sidelink communications between the first UE and at least a second UE, and transmitting at least one control message to jointly schedule the first UE for the access network communications and the sidelink communications, where the at least one control message includes the network control information and the sidelink control information.

An apparatus for wireless communications at a base station is described. The apparatus may include a processor, memory coupled with the processor, and instructions stored in the memory. The instructions may be executable by the processor to cause the apparatus to identify network control information associated with access network communications between the base station and a first UE, identify sidelink control information associated with sidelink communications between the first UE and at least a second UE, and transmit at least one control message to jointly schedule the first UE for the access network communications and the sidelink communications, where the at least one control message includes the network control information and the sidelink control information.

Another apparatus for wireless communications at a base station is described. The apparatus may include means for identifying network control information associated with access network communications between the base station and a first UE, identifying sidelink control information associated with sidelink communications between the first UE and at least a second UE, and transmitting at least one control message to jointly schedule the first UE for the access network communications and the sidelink communications, where the at least one control message includes the network control information and the sidelink control information.

A non-transitory computer-readable medium storing code for wireless communications at a base station is described. The code may include instructions executable by a processor to identify network control information associated with access network communications between the base station and a first UE, identify sidelink control information associated with sidelink communications between the first UE and at least a second UE, and transmit at least one control message to jointly schedule the first UE for the access network communications and the sidelink communications, where the at least one control message includes the network control information and the sidelink control information.

In some examples of the method, apparatuses, and non-transitory computer-readable medium described herein, transmitting the at least one control message may include operations, features, means, or instructions for transmitting the sidelink control information and the network control information in separate but linked messages.

In some examples of the method, apparatuses, and non-transitory computer-readable medium described herein, transmitting the at least one control message may include operations, features, means, or instructions for transmitting the sidelink control information and the network control information in a same control message.

In some examples of the method, apparatuses, and non-transitory computer-readable medium described herein, transmitting the at least one control message further may include operations, features, means, or instructions for transmitting a first control message to the first UE, the first control message including the network control information and an indication that the sidelink control information may be to be transmitted via a second message, and transmitting the second message to the first UE, the second message including the sidelink control information.

In some examples of the method, apparatuses, and non-transitory computer-readable medium described herein, the first control message includes DCI associated with a downlink grant for the first UE and the second message includes an RRC message associated with a sidelink grant for the first UE, the second UE, or both, the RRC message piggybacked on a data message scheduled by the DCI.

In some examples of the method, apparatuses, and non-transitory computer-readable medium described herein, transmitting the second message may include operations, features, means, or instructions for transmitting an indication of one or more resources associated with the sidelink communications, the one or more resources including a sidelink control channel, a sidelink shared channel, a feedback channel, or any combination thereof.

In some examples of the method, apparatuses, and non-transitory computer-readable medium described herein, the feedback channel may be associated with uplink feedback, the uplink feedback including ARQ communications with the first UE, CSI report transmissions from the first UE, or a combination thereof, where the uplink feedback may be decoded based on uplink control information.

In some examples of the method, apparatuses, and non-transitory computer-readable medium described herein, a first resource of the one or more resources includes resources for both the sidelink control channel and the sidelink shared channel.

In some examples of the method, apparatuses, and non-transitory computer-readable medium described herein, a first resource of the one or more resources includes resources for the sidelink control channel and a second resource of the one or more resource includes resources for the sidelink shared channel.

In some examples of the method, apparatuses, and non-transitory computer-readable medium described herein, the sidelink control channel indicates a resource assigned to the feedback channel, the feedback channel may be configured with a feedback resource pool, or a combination thereof.

In some examples of the method, apparatuses, and non-transitory computer-readable medium described herein, transmitting the at least one control message further may include operations, features, means, or instructions for transmitting a first control message to the first UE, the first control message including the network control information and the sidelink control information.

In some examples of the method, apparatuses, and non-transitory computer-readable medium described herein, the first control message includes DCI associated with an integrated grant for the first UE, the integrated grant including one or more fields corresponding to a sidelink grant and a downlink grant or an uplink grant.

In some examples of the method, apparatuses, and non-transitory computer-readable medium described herein, the first control message includes an indication that the integrated grant may be included in the DCI.

In some examples of the method, apparatuses, and non-transitory computer-readable medium described herein, the first control message includes an indication of one or more BWPs for the access network communications, the sidelink communications, or both.

Some examples of the method, apparatuses, and non-transitory computer-readable medium described herein may further include operations, features, means, or instructions for determining one or more sidelink resources for the first UE, the second UE, or both, the one or more sidelink resources including a transmission resource, a reception resource, or both, where the sidelink control information includes an indication of the one or more sidelink resources.

In some examples of the method, apparatuses, and non-transitory computer-readable medium described herein, the one or more sidelink resources include a resource pool for the sidelink communications.

Some examples of the method, apparatuses, and non-transitory computer-readable medium described herein may further include operations, features, means, or instructions for scheduling the one or more sidelink resources for the first UE, where the at least one control message indicates the one or more sidelink resources.

In some examples of the method, apparatuses, and non-transitory computer-readable medium described herein, the sidelink control information includes one or more sidelink parameters for the sidelink communications between the first UE and the second UE, the one or more sidelink parameters including a transmission power parameter, an MCS, an NDI, HARQ parameters, a DAI, a resource assignment expiration timer, or a combination thereof.

In some examples of the method, apparatuses, and non-transitory computer-readable medium described herein, the sidelink control information includes a group identifier of a group of UEs including the first UE and the second UE, a sidelink RNTI for groupcast communications within the group of UEs, or a combination thereof.

Some examples of the method, apparatuses, and non-transitory computer-readable medium described herein may further include operations, features, means, or instructions for assigning a resource or a resource pool for the sideline communications to each UE of a group of UEs, the group of UEs including the first UE and the second UE.

Some examples of the method, apparatuses, and non-transitory computer-readable medium described herein may further include operations, features, means, or instructions for identifying a RNTI corresponding to a first control message of the at least one control message, where the first control message includes DCI and the RNTI may be associated with joint scheduling of access network communications and sidelink communications, and scrambling a CRC code of the first control message based on the identified RNTI.

Some examples of the method, apparatuses, and non-transitory computer-readable medium described herein may further include operations, features, means, or instructions for performing dynamic scheduling, SPS, one time scheduling, or a combination thereof for the access network communications, the sidelink communications, or both.

DETAILED DESCRIPTION

Figure 1:
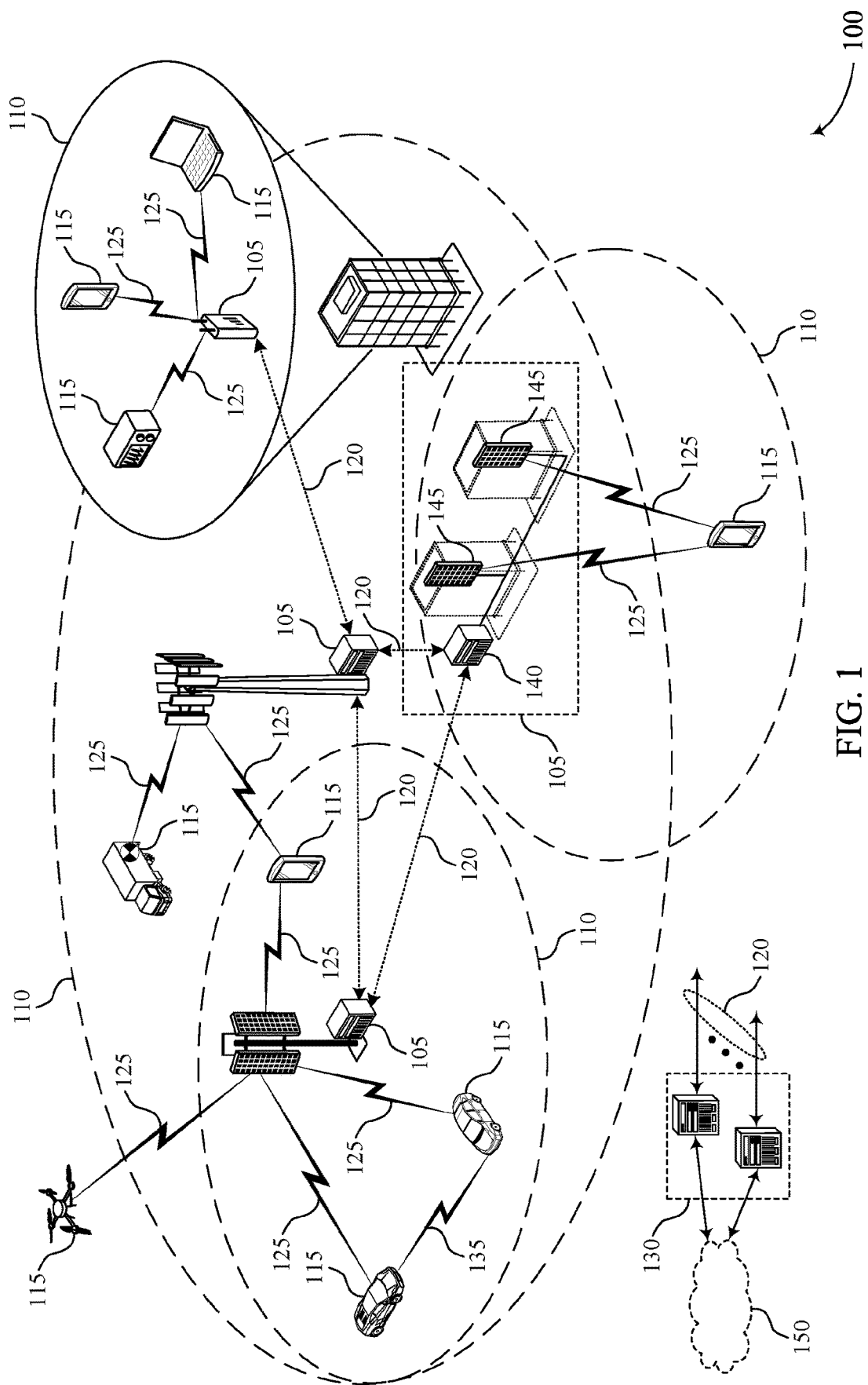
FIGS. 1 and 2 illustrate examples of wireless communications systems that support access network and sidelink joint scheduling in accordance with aspects of the present disclosure.

A wireless communications system may support access links and sidelinks for communications between wireless devices. An access link may refer to a communication link between a user equipment (UE) and a base station. For example, an access link may support access network communications between the UE and the base station, such as uplink signaling, downlink signaling, connection procedures, etc. A sidelink may refer to any communication link between similar wireless devices (e.g., a communication link between UEs in a group of UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

According to some aspects, a wireless device (e.g., a base station and/or a UE) may implement techniques to jointly configure access network communications and sidelink communications, which may result in reduced latency (e.g., of relatively high priority transmissions) and more efficient communications. For example, a group of UEs may be engaged in an interactive gaming activity. In such an example, each UE may operate an application (e.g., an interactive game) and the UEs may have traffic associated with the application. Joint configuration of the access network communications and the sidelink communications may enable a UE to communicate such traffic with a base station (e.g., via access links) and with the other UEs (e.g., via sidelinks). For example, portions of the traffic may be split into different packet data units (PDUs) based on latency thresholds (e.g., a quality of service (QoS) threshold). PDUs with a relatively low latency threshold (e.g., a relatively high priority threshold) may be configured to be transmitted to another UE via sidelinks. Additionally or alternatively, PDUs with a relatively high latency threshold (e.g., a relatively low priority threshold) may be configured to be transmitted to the base station via access links. As an example, traffic associated with an interactive game may be split into sidelink traffic to the other UEs (e.g., interactive messages between one or more users which may correspond to a low latency threshold and/or a relatively large amount of bandwidth) and into access link traffic to the base station (e.g., game map data, background updating data, user profile data, score updating data, among other examples, which may correspond to a normal or high latency threshold and/or relatively infrequent transmission). Additionally or alternatively, such joint configuration may be applied to other wireless communications systems, such as a V2X system implementing joint configuration of sidelink communications and access network communications, which may result in power savings due to the reduced processing complexity of configuring the sidelink communications and access network communications together compared to separately configuring the communications.

In some examples, a base station may jointly schedule sidelink resources and access network resources for one or more UEs. For example, the base station may determine resources for uplink and/or downlink transmissions for a UE in a group of UEs. Additionally or alternatively, the base station may determine resources for sidelink transmissions (e.g., PC5 transmissions) for a UE in a group of UEs, such as a resource pool shared between the UEs, resources assigned to the UE for communications with the group of UEs (e.g., groupcast transmissions, unicast transmissions, among other sidelink communications). The base station may jointly schedule the UE with the sidelink resources and the access network resources via control signaling. For example, the base station may transmit one or more messages to the UE indicating the sidelink resources and the access network resources.

In some examples, the one or more messages may include a first message (e.g., a control message) and a second message. The first message may include control information (e.g., downlink control information (DCI)) associated with a downlink grant. For example, the control information may include information for a downlink transmission to the UE from the base station, such as scheduled resources for the downlink transmission. The control message may also include an indication of a sidelink grant. The indication may be a field of the first message (e.g., a bit field) indicating that control information associated with a sidelink grant may be included in the second message. For example, the control information for a sidelink transmission may be included in a radio resource control (RRC) message indicated by the first message. In other words, the sidelink grant may be "piggy-backed" on the second message (e.g., the RRC message).

In some other examples, the first message may include control information associated with an integrated grant (e.g., a sidelink grant and an access link grant, such as a downlink grant or an uplink grant). For example, the first message may include a DCI format with a field for the sidelink communications (e.g., a field including the control information of the sidelink grant) and a field for the access network communications (e.g., a field including the control information associated with the access link grant). In some examples, the first message may also include an indication that the first message includes control information for the integrated grant, such as a bit indicator and/or a radio network temporary identifier (RNTI) associated with the joint configuration message.

Aspects of the disclosure are initially described in the context of wireless communications systems. Aspects of the disclosure are further illustrated by and described with reference to flowcharts, apparatus diagrams, and system diagrams, that relate to access network and sidelink joint scheduling.

FIG. 1 illustrates an example of a wireless communications system 100 that supports access network and sidelink joint scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to some aspects, a base station 105 and a UE 115 (e.g., in a group of UEs 115) may implement various techniques that support joint scheduling of access network communications and sidelink communications, which may result in more efficient communications, improved latency, and power saving enhancements, among other advantages. For example, the base station 105 may jointly schedule the UE 115 with resources for both access links and sidelinks using control signaling. The control signaling may include one or more messages to schedule and/or configure the UE 115 for both access network communications and sidelink communications. In some examples, the one or more messages may include a sidelink grant and/or an indication of a sidelink grant, a downlink or an uplink grant, or any combination thereof. For example, the one or more messages may include DCI corresponding to an access link grant (e.g., an uplink grant or a downlink grant) and a sidelink grant and/or an indication of a sidelink grant. Additionally or alternatively, the one or more messages may include a radio resource control (RRC) message corresponding to a sidelink grant (e.g., indicated by the DCI message).

Figure 2:
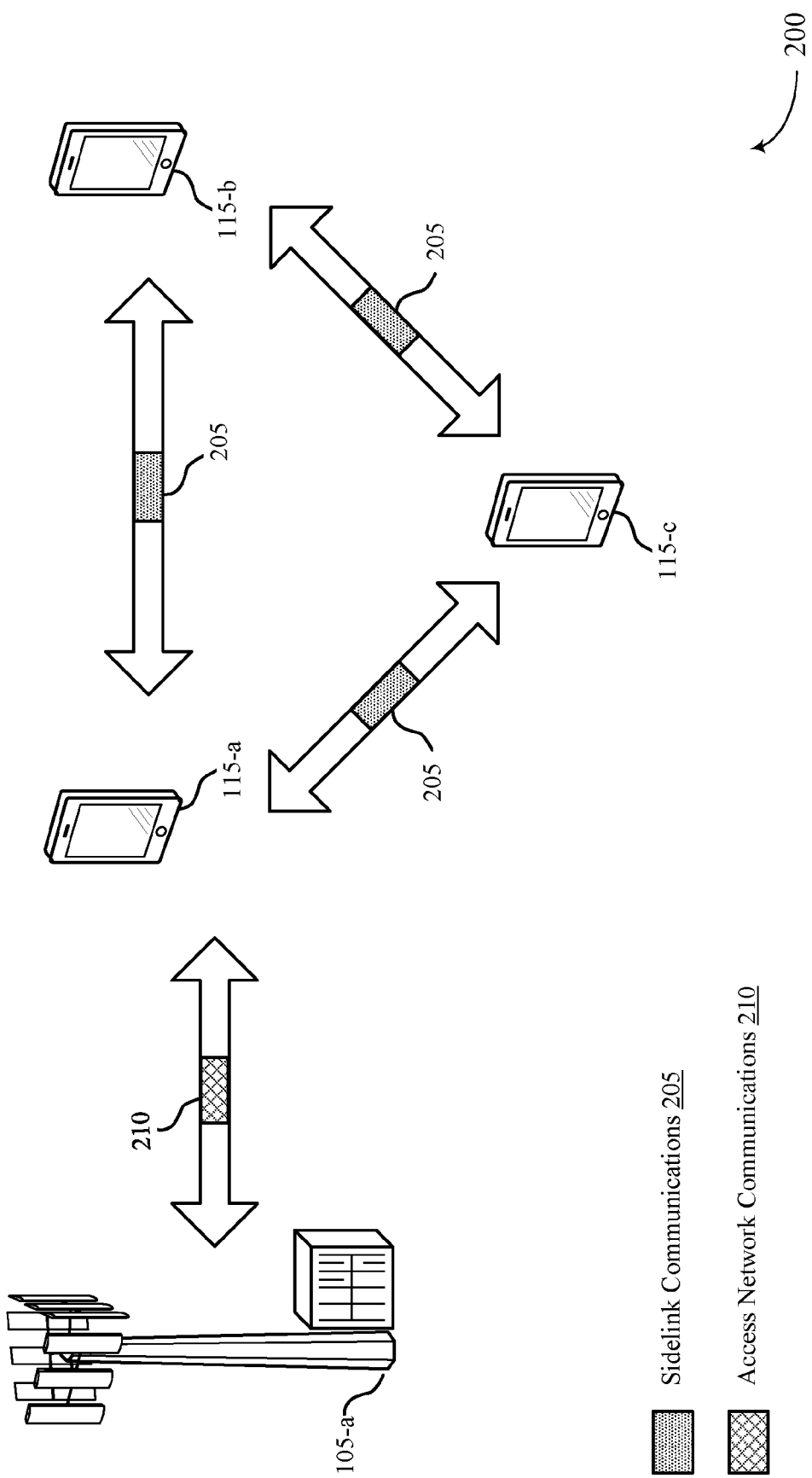

FIG. 2 illustrates an example of a wireless communications system 200 that supports access network and sidelink joint scheduling in accordance with aspects of the present disclosure. In some examples, the wireless communications system 200 may implement aspects of wireless communications system 100 and may include a group of UEs 115 (e.g., a UE 115-a, a UE 115-b, and a UE 115-c) and a base station 105-a, which may be examples of UEs 115 and a base station 105, respectively, described with reference to FIG. 1. In some cases, the group of UEs 115 may communicate with each other (e.g., via sidelink communications) and/or with the base station 105-b (e.g., via access link communications). The UEs 115 and the base station 105-b may employ techniques for joint configuration of access network communications and sidelink communications to realize more efficient communications, among other advantages such as reliable communications of traffic with low latency thresholds.

The group of UEs 115 may communicate with each other (or with another group of UEs 115) over sidelink communications 205 (e.g., using a peer-to-peer (P2P) or D2D protocol). For example, the UE 115-a may monitor resource pools for the sidelink communications 205 or indications of the sidelink communications 205 (e.g., resource reservations, control channel transmissions, among other examples) from the UEs 115-b and 115-c. Additionally or alternatively, the UE 115-a may have data to transmit to one or more of the UE 115-b or the UE 115-c and may use the sidelink communications 205 to transmit the data.

The group of UEs 115 may utilize access links (e.g., the access network communications 210) with the base station 105-a in addition to the sidelinks (e.g., the sidelink communications 205). For example, one or more of the UEs 115 may be in a coverage area (e.g., a coverage area 110 with reference to FIG. 1) of the base station 105-a. In such examples, a UE 115 may communicate with the base station 105-a via a Uu interface. For example, the base station 105-a may transmit downlink communications to one or more of the UEs 115 or a UE 115 may transmit uplink communications to the base station 105-a. In some cases, the access network communications 210 and the sidelink communications 205 may be configured separately, which may result in inefficient communications.

According to some aspects, the access network communications 210 and the sidelink communications 205 may be jointly configured as described herein. For example, the base station 105-a may schedule resources for one or more of the UEs 115 to utilize for access network communications 210. The base station 105-a may also schedule resources for the group of UEs 115 to utilize for sidelink communications 205. The base station 105-a may indicate the resources to the UEs 115, for example, via control signaling. Thus, the base station 105-a may jointly schedule access link resources and sidelink resources for the one or more UEs 115, which may result in more efficient communications.

For example, the UE 115-a, the UE 115-b, and the UE 115-c may be engaged in an interactive gaming activity, and joint scheduling of access link resources and sidelink resources may enable reduced latency for relatively high priority transmissions. In such an example, each UE 115 may operate an application (e.g., an interactive game) and the UE 115-a may have traffic associated with the application. The UE 115-a may communicate a portion of the traffic with a base station (e.g., via access links). For example, the UE 115-a may split the traffic into different packet data units (PDUs) based on latency thresholds, such as QoS thresholds. The UE 115-a may transmit and/or receive relatively low priority PDUs via access links (e.g., PDUs corresponding to high latency thresholds, such as game map data, background update data, user profile data of a user associated with the UE 115-a, scoring data, etc.). Additionally or alternatively, the UE 115-a may transmit and/or receive relatively high priority PDUs via sidelinks with the UE 115-b and/or the UE 115-c (e.g., PDUs corresponding to low latency thresholds, such as interactive messages between one or more users of the UEs 115). Accordingly, the base station 105-a may jointly schedule resources for the sidelink communications 205 and the access network communications 210 to enable such traffic communication.

The base station 105-a may jointly configure the sidelink communications 205 and the access network communications 210 for the UE 115-a. For example, the base station 105-a may determine control information associated with the access network communications 210 (e.g., network control information corresponding to uplink transmissions such as uplink control information (UCI) or network control information corresponding to downlink transmissions such as DCI). Additionally or alternatively, the base station 105-a may determine control information associated with the sidelink communications 205, such as sidelink control information corresponding to sidelink transmissions (e.g., PC5 transmissions) within the group of UEs 115. The base station 105-a may transmit control information to the UEs 115 via control signaling, such as messages including access link grants (e.g., uplink grants or downlink grants), sidelink grants, or integrated grants (e.g., both an access link grant and a sidelink grant).

In some examples, the base station 105-a may jointly configure the UE 115-a with a downlink grant included in a first message (e.g., a control message) and a sidelink grant included in a second message. For example, one or more resources for the access network communications 210 may be configured by DCI of the first message, and one or more sidelink resources (e.g., PC5 resources) may be configured by the second message, which may be an RRC message (i.e., the sidelink grant may be included in an RRC message "piggy-backed" on a data message scheduled by the DCI). The base station 105-a may transmit the first message including a downlink grant to the UE 115-a. The first message may include the determined control information associated with the access network communications 210, such as DCI for a downlink transmission. The DCI may include resources for the UE 115-a to monitor for a downlink data transmission from the base station 105-a. For example, the base station 105-a may transmit the DCI via a PDCCH, and the DCI may indicate resources of a physical downlink shared channel (PDSCH) for the UE 115-a to monitor for a subsequent data transmission. Additionally, the DCI may include other information related to the downlink grant, such as downlink transmission parameters (e.g., MCS, decoding parameters, etc.).

The first message may also include additional information associated with the sidelink grant. For example, the first message may include an indication that the sidelink grant is included in the second message (e.g., a 1 bit on/off indicator). The first message may also include an identifier (ID) or an RNTI for the UE 115-a to use for the sidelink communications 205 (e.g., sidelink transmissions corresponding to the sidelink grant). The first message may also include a timing offset/timing advance to use for the sidelink communications 205 (e.g., sidelink transmissions and sidelink reception). In some cases, the DCI of the first message may also be scrambled with an RNTI associated with the first message (e.g., to differentiate the first message with a DCI that does not include an indication of a sidelink grant).

The base station 105-a may transmit the second message (e.g., the RRC message including the sidelink grant) to the UE 115-a. For example, the first message may indicate that the second message includes the sidelink grant and resources (e.g., resources of a PDSCH) for the UE 115-a to monitor to receive the second message. In some examples, the sidelink grant may be referred to as a PC5 grant or a PC5 resource grant. The sidelink grant may include the determining control information associated with the sidelink communications 205 (i.e., sidelink control information). The sidelink control information may indicate sidelink resources for communications between the UEs 115 (e.g., the sidelink communications 205).

In some examples, the sidelink resources may include a resource pool shared between the UEs 115 (e.g., a resource pool for transmissions between the UEs 115) and the sidelink control information may include sidelink transmission parameters for the resource pool (e.g., power parameters such as transmit power control (TPC), a MCS, among other examples). The UE 115-a may utilize the resource pool for sending transmissions to the UEs 115-b and 115-c and/or reserve resources in the resource pool for transmissions to another UE 115 (e.g., groupcast transmissions to the UEs 115-b and 115-c, unicast transmissions to the UE 115-b, among other sidelink communications). The second message may also include a resource assignment expiration timer associated with the resource pool (e.g., a time period where the resource pool is configured for use with the sidelink communications 205, such that when the time period elapses the UEs 115 may refrain from utilizing the resource pool, or use a resource pool indicated by an updated sidelink grant).

The resource pool may include various channels, such as a sidelink control channel (e.g., a physical sidelink control channel (PSCCH)), a feedback channel, a sidelink data channel (e.g., a physical sidelink shared channel (PSSCH)), or a combination of these channels and/or other examples of communication channels. In some examples, the sidelink control channel and the sidelink data channel may correspond to the same resource pool (e.g., one resource pool includes both channels). In some other examples, the sidelink control channel and the sidelink data channel may correspond to different resource pools (e.g., two resource pools may be configured to include each channel). The feedback channel may be scheduled by communications from the other UEs 115 via the sidelink control channel or scheduled by communications with the base station 105-a. For example, the UE 115-a may be assigned resources for the feedback channel, or the feedback channel may be configured with a feedback resource pool (e.g., included in the resource pool or a different resource pool from the other channels). In some examples, the feedback channel may be utilized for feedback communications (e.g., HARQ and/or ARQ transmissions), channel state indicator (CSI) reporting, among other examples of feedback (e.g., uplink feedback transmissions to the base station 105-a, the uplink feedback coded in accordance with UCI coding methods).

In some examples, the sidelink resources may include resources assigned to the UE 115-a for communications with the group of UEs 115 (e.g., groupcast transmissions, unicast transmissions, among other sidelink communications). The second message (e.g., the sidelink control information) may indicate the assigned resources for sidelink control transmissions, sidelink data transmissions, among other examples of sidelink communications. The base station 105-a may schedule the UEs 115 (e.g., via one time scheduling, semi-persistent scheduling (SPS), among other examples) with an indication of the assigned resources. For example, the sidelink control information may include an indication of time and frequency associated with the resources, spatial information associated with the resources (e.g., spatial multiplexing), ARQ and/or HARQ parameters (e.g., HARQ redundancy version (RV)), an MCS, a new data indicator (NDI), a downlink assignment indicator (DAD), among other examples of information associated with the sidelink transmissions of the sidelink grant.

The sidelink resources may also include a reception resource pool for the sidelink transmissions (e.g., including the assigned resources for the sidelink transmissions and/or the resource pool for sidelink transmissions). The UE 115-*a* may utilize the resource pool for monitoring and receiving transmissions from the UEs 115-*b* and 115-*c*. The base station 105-*a* may include a resource (e.g., a time and frequency indication of a resource) associated with the reception resource pool, an assignment expiration timer associated with the reception resource pool (e.g., a time period for the UEs 115 to monitor the reception resource pool for any transmissions from the other UEs 115), etc. In some examples, the reception resource pool may be the same as the resource pool for transmissions between the UEs 115. For example, the base station 105-*a* may implicitly configure the UEs 115 with a resource pool for both transmissions and receptions (e.g., for groupcast transmissions in the group of UEs 115). Additionally or alternatively, the reception resource pool may be different than the resource pool for transmissions. For example, the base station 105-*a* may explicitly assign resources for sidelink transmissions and the UEs 115 may monitor a reception resource pool using an ID and/or an RNTI (e.g., included in the first message or the second message), for example, to scramble and/or descramble unicast communications with another UE 115.

In some examples, the base station 105-*a* may jointly configure the UE 115-*a* with an integrated grant message. The integrated grant message may include a grant for both an access link (e.g., a downlink grant or an uplink grant) and a sidelink (e.g., a sidelink grant). For example, the integrated grant message may include grant DCI (e.g., an integrated grant DCI format) with two fields for a Uu interface and a PC5 interface. The base station 105-*a* may transmit the integrated grant message to the UE 115-*a* to jointly schedule access resources (e.g., for the access network communications 210) and sidelink resources (e.g., for the sidelink communications 205).

The integrated grant message may include bandwidth parts (BWPs) for the access link and the sidelink. For example, the BWP for the sidelink may be the same as the BWP for the access link, or the BWP for the sidelink may be different than the BWP for the access link. The integrated grant message may also include control information corresponding to the access link grant and the sidelink grant. For example, the integrated grant message may include control information for the access link (e.g., a DCI format 1 for a downlink grant or a DCI format 0 for an uplink grant), such as time and frequency associated with the access resources, spatial information associated with the access resources (e.g., spatial multiplexing), HARQ parameters (e.g., HARQ RV), an MCS, a new data indicator (NDI), a downlink assignment indicator (DAI), among other examples. The integrated grant message may also include a joint DCI indicator (e.g., a 1 bit indicator that the DCI includes both an access link grant and a sidelink grant). The integrated grant message may also include control information for the sidelink, such as sidelink resources, sidelink communication parameters (e.g., TPC, MCS, NDI for an assigned resource configuration for the UE 115-*a*), etc. For example, the control information may indicate sidelink resource pools for sidelink transmissions and/or receptions or assigned transmission resources for the UE 115-*a* as described herein.

In some cases, the joint scheduling (e.g., resource assignments) described herein may be associated with an RNTI. The RNTI may be used by the base station 105-*a* and/or the UEs 115 to scramble/descramble a cyclic redundancy check (CRC) code of a control message (e.g., a DCI message such as the integrated grant message), for example, to differentiate the joint scheduling grant with an access scheduling grant or a separately scheduled sidelink scheduling grant. In some cases, the access network (e.g., Uu) scheduling or the sidelink network (e.g., PC5) scheduling may be dynamic scheduling, SPS, or one time scheduling.

Figure 3:
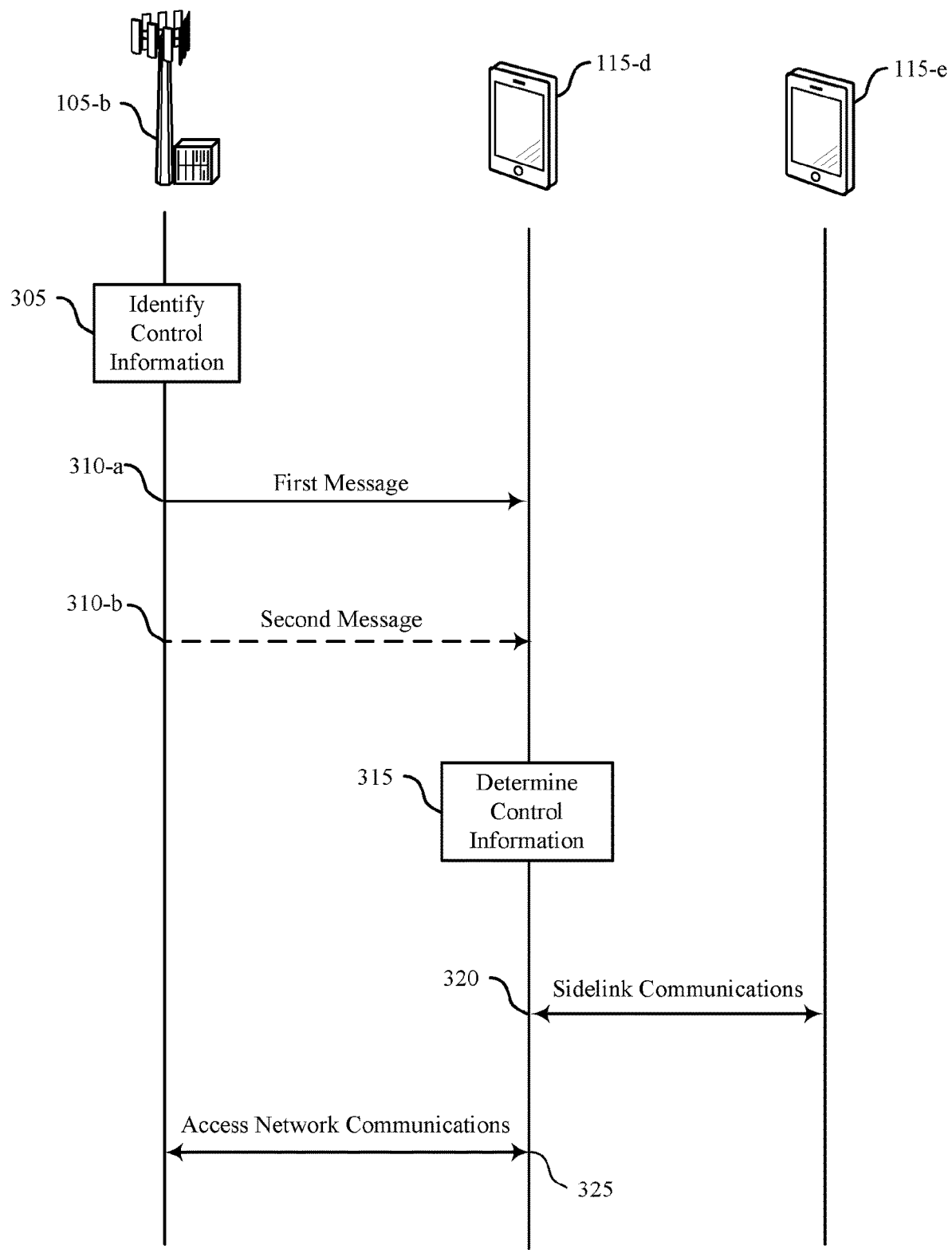
FIG. 3 illustrates an example of a process flow that supports access network and sidelink joint scheduling in accordance with aspects of the present disclosure.

FIG. 3 illustrates an example of a process flow 300 that supports access network and sidelink joint scheduling in accordance with aspects of the present disclosure. In some examples, process flow 300 may implement aspects of wireless communications systems 100 or 200. The process flow 300 may include a UE 115-*d* and a UE 115-*e*, which may be examples of UEs 115 (e.g., UEs 115-*a*, 115-*b*, and 115-*c*) as described with reference to FIGS. 1 and 2. The process flow 300 may also include a base station 105-*b*, which may be an example of a base station 105 (e.g., base station 105-*a*) as described with reference to FIGS. 1 and 2.

In the following description of the process flow 300, the operations between the base station 105-*b* and the UEs 115 may be transmitted in a different order than the order shown, or the operations performed by base station 105-*b* and the UEs 115 may be performed in different orders or at different times. Certain operations may also be left out of the process flow 300, or other operations may be added to the process flow 300. It is to be understood that while the base station 105-*b*, the UE 115-*d*, and the UE 115-*e* are shown performing a number of the operations of process flow 300, any wireless device may perform the operations shown.

At 305, the base station 105-*b* may identify control information. For example, the base station 105-*b* may identify network control information for access network communications with the UE 115-*d* and sidelink control information for sidelink communications between the UE 115-*d* and the UE 115-*e*. The control information may be an example of the control information described with reference to FIG. 2, such as resource assignments/configurations (e.g., sidelink resource pools or assigned resources for sidelink transmissions, resources for downlink and/or uplink transmissions from the UE 115-*d* to the base station 105-*b*, etc.).

At 310-*a*, the base station 105-*b* may transmit a first message to the UE 115-*d*. For example, the base station 105-*b* may transmit a control message (e.g., including DCI) as described herein with reference to FIG. 2. In some examples, the first message may include an integrated grant as described herein (e.g., an access grant such as an uplink grant or a downlink grant, in addition to a sidelink grant). In some other examples, the first message may include an access grant and an indication of a sidelink grant. For example, the first message may include an indication that the sidelink grant may be transmitted in a second message to the UE 115-*d* (e.g., an RRC message piggybacked onto a data message scheduled by the DCI message). In such examples, the base station 105-*b* may transmit the second message at 310-*b*.

At 315, the UE 115-*d* may determine control information based on the received messages (e.g., the first message at 310-*a* and/or the second message at 310-*b*). For example, the UE 115-*d* may be configured for access network communications (e.g., the UE 115-*d* may determine resources and/or communication parameters as described with reference to FIG. 2 to use for downlink or uplink communications with the base station 105-b) based on the network control information. Additionally, the UE 115-d may be configured for sidelink communications (e.g., the UE 115-d may determine resources and/or communication parameters as described with reference to FIG. 2 to use for sidelink communications with the UE 115-e) based on the sidelink control information.

At 320, the UE 115-d may perform sidelink communications with the UE 115-e based on the determined control information. For example, based on the received sidelink control information the UE 115-d may monitor a resource pool for transmissions from the UE 115-e, utilize the resource pool and/or assigned resource for transmissions to the UE 115-e, among other examples as described with reference to FIG. 2. Additionally or alternatively, at 325 the UE 115-d may perform access network communications based on the determined control information. For example, the UE 115-d may utilize resource (e.g., indicated by an uplink or downlink grant) to communicate with the base station 105-b as described herein with reference to FIGS. 1 and 2.

Figure 4:
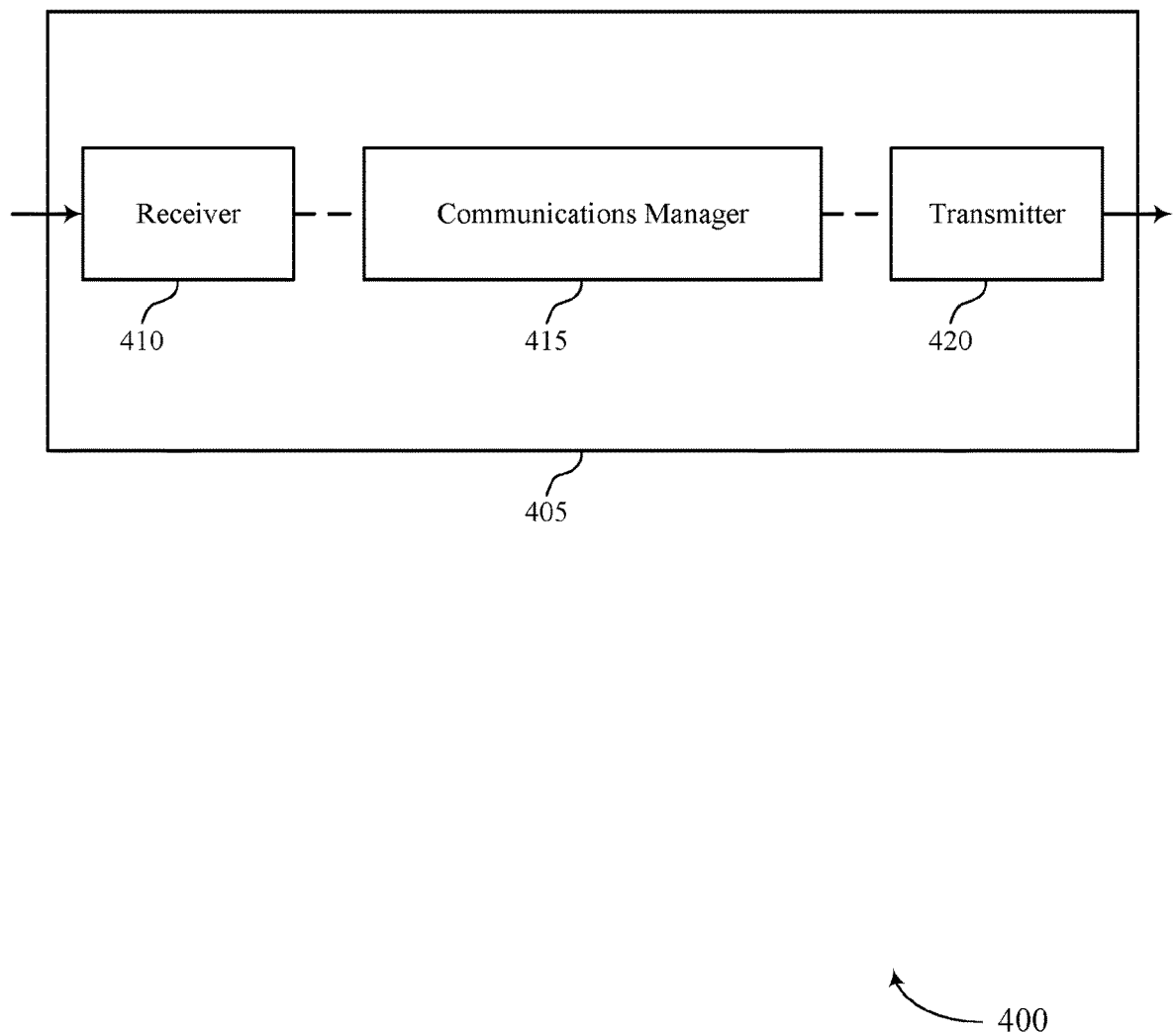
FIGS. 4 and 5 show block diagrams of devices that support access network and sidelink joint scheduling in accordance with aspects of the present disclosure.

FIG. 4 shows a block diagram 400 of a device 405 that supports access network and sidelink joint scheduling in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to access network and sidelink joint scheduling, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive at least one control message from a base station, the at least one control message jointly scheduling the first UE for access network communications between the first UE and the base station and for sidelink communications between the first UE and at least a second UE, determine network control information associated with the access network communications based on the at least one control message, determine sidelink control information associated with the sidelink communications based on the at least one control message, and communicate with the base station and the second UE in accordance with the network control information and the sidelink control information, respectively. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 415 as described herein may be implemented to realize one or more potential advantages. One implementation may enable a wireless device, such as a UE 115, to be jointly configured with access network communications and sidelink communications. For example, the UE 115 may be jointly scheduled with access resources and sidelink resources as described herein. Such an implementation may enable the wireless device to utilize reduced processing complexity and/or power consumption due to less signaling overhead for a joint configuration procedure compared to separate configuration procedures for access network communications and sidelink communications, among other advantages.

Based on implementing the techniques as described herein, a processor of the UE 115 (e.g., a processor controlling the receiver 410, the communications manager 415, and the transmitter 420, etc.) may utilize a reduced latency scheme (e.g., communicate some traffic over sidelinks and some traffic over access links based on a QoS threshold) which may result in more reliable communications. Therefore, the UE 115 may realize increased reliability and efficiency of communications at the processor of the UE 115.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
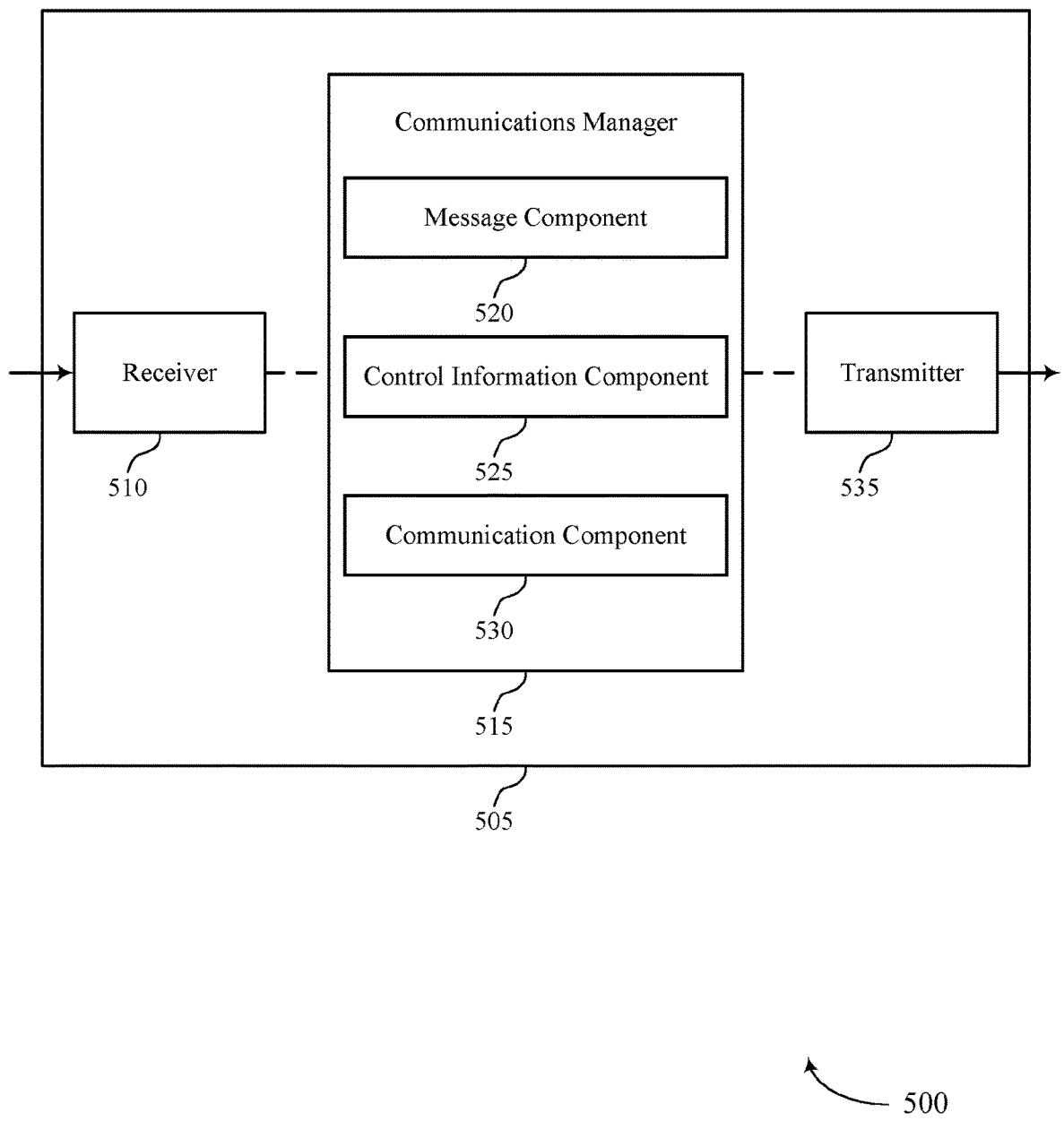

FIG. 5 shows a block diagram 500 of a device 505 that supports access network and sidelink joint scheduling in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to access network and sidelink joint scheduling, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a message component 520, a control information component 525, and a communication component 530. The communications manager 515 may be an example of aspects of the communications manager 710 described herein.

The message component 520 may receive at least one control message from a base station, the at least one control message jointly scheduling the first UE for access network communications between the first UE and the base station and for sidelink communications between the first UE and at least a second UE.

The control information component 525 may determine network control information associated with the access network communications based on the at least one control message and determine sidelink control information associated with the sidelink communications based on the at least one control message.

The communication component 530 may communicate with the base station and the second UE in accordance with the network control information and the sidelink control information, respectively.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
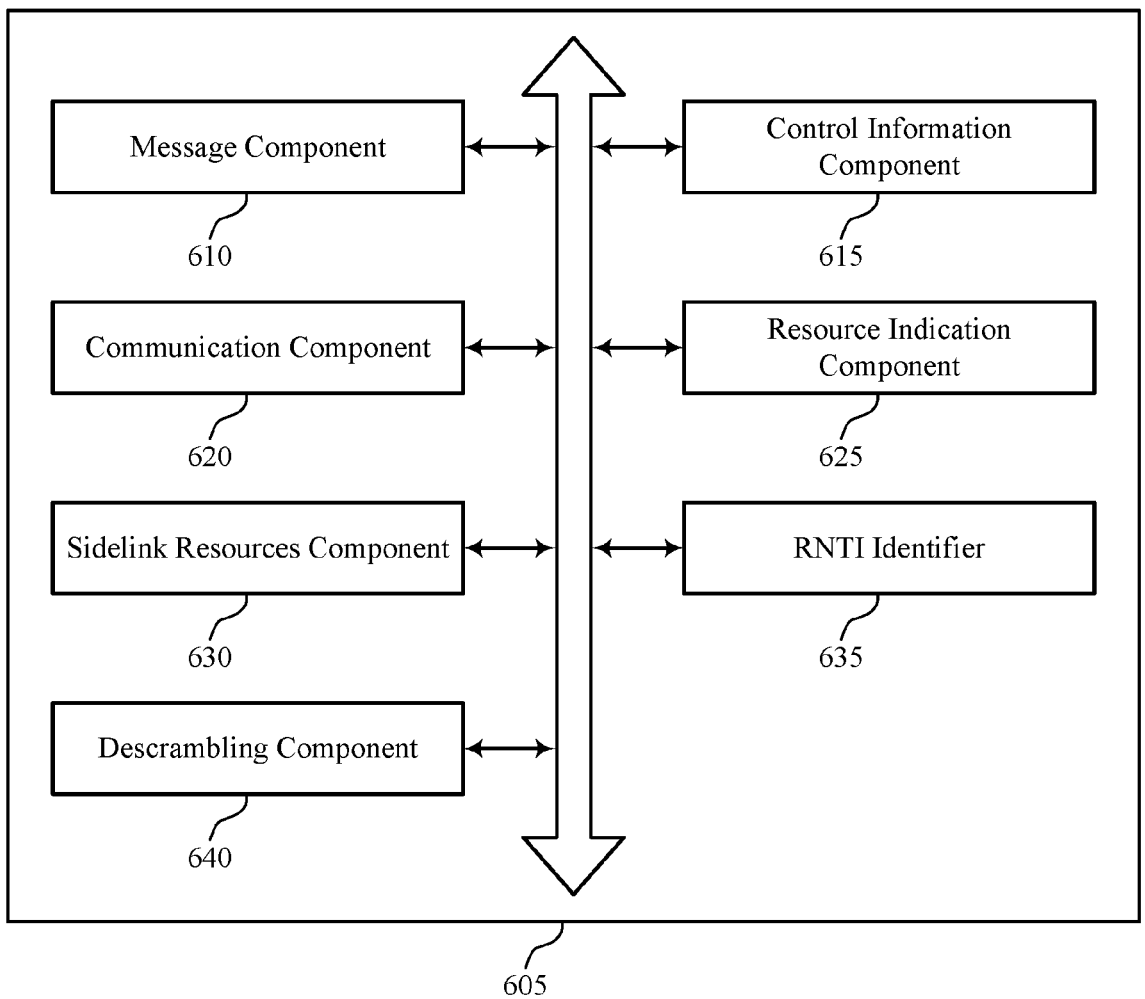
FIG. 6 shows a block diagram of a communications manager that supports access network and sidelink joint scheduling in accordance with aspects of the present disclosure.

FIG. 6 shows a block diagram 600 of a communications manager 605 that supports access network and sidelink joint scheduling in accordance with aspects of the present disclosure. The communications manager 605 may be an example of aspects of a communications manager 415, a communications manager 515, or a communications manager 710 described herein. The communications manager 605 may include a message component 610, a control information component 615, a communication component 620, a resource indication component 625, a sidelink resources component 630, an RNTI identifier 635, and a descrambling component 640. Each of these modules may communicate, directly or indirectly, with one another (e.g., via one or more buses).

The message component 610 may receive at least one control message from a base station, the at least one control message jointly scheduling the first UE for access network communications between the first UE and the base station and for sidelink communications between the first UE and at least a second UE. In some examples, the message component 610 may receive a first control message from the base station, the first control message including the network control information and an indication that the sidelink control information is to be received via a second message. In some examples, the message component 610 may receive the second message from the base station, the second message including the sidelink control information. In some examples, the message component 610 may receive an indication of one or more resources associated with the sidelink communications, the one or more resources including a sidelink control channel, a sidelink shared channel, a feedback channel, or any combination thereof. In some examples, the message component 610 may receive a first control message from the base station, the first control message including the network control information and the sidelink control information. In some cases, the first control message includes DCI associated with a downlink grant for the first UE and the second message includes a RRC message associated with a sidelink grant for the first UE and piggybacked on a data message scheduled by the DCI. In some cases, the feedback channel is associated with uplink feedback, the uplink feedback including HARQ communications with the base station, channel state indicator CSI report transmissions to the base station, or a combination thereof, where the uplink feedback is coded based on uplink control information received from the base station. In some cases, a first resource of the one or more resources includes resources for both the sidelink control channel and the sidelink shared channel. In some cases, a first resource of the one or more resources includes resources for the sidelink control channel and a second resource of the one or more resources includes resources for the sidelink shared channel. In some cases, the first control message includes DCI associated with an integrated grant for the first UE, the integrated grant including one or more fields corresponding to a sidelink grant and a downlink grant or an uplink grant. In some cases, the first control message includes an indication that the integrated grant is included in the DCI. In some cases, the first control message includes an indication of one or more BWPs for the access network communications, the sidelink communications, or both.

The control information component 615 may determine network control information associated with the access network communications based on the at least one control message. In some examples, the control information component 615 may determine sidelink control information associated with the sidelink communications based on the at least one control message. In some examples, the control information component 615 may receive the sidelink control information and the network control information in separate but linked messages. In some examples, the control information component 615 may receive the sidelink control information and the network control information in a same control message. In some cases, the sidelink control information includes one or more sidelink parameters for the sidelink communications between the first UE and the second UE, the one or more sidelink parameters including a transmission power parameter, an MCS, an NDI, HARQ parameters, a DAI, a resource assignment expiration timer, or a combination thereof. In some cases, the sidelink control information includes a group identifier of a group of UEs including the first UE and the second UE, a sidelink RNTI for groupcast communications within the group of UEs, or a combination thereof.

The communication component 620 may communicate with the base station and the second UE in accordance with the network control information and the sidelink control information, respectively.

The resource indication component 625 may receive an indication of a resource assigned to the feedback channel, a resource pool configured for the feedback channel, or a combination thereof.

The sidelink resources component 630 may determine one or more sidelink resources for the sidelink communications based on the received sidelink control information, the one or more sidelink resources including a transmission resource, a reception resource, or both. In some cases, the one or more sidelink resources include a resource pool for the sidelink communications. In some cases, the one or more sidelink resources are assigned to the first UE for the sidelink communications.

The RNTI identifier 635 may identify an RNTI corresponding to a first control message of the at least one control message, where the first control message includes DCI and the RNTI is associated with joint scheduling of access network communications and sidelink communications.

The descrambling component 640 may descramble a CRC code of the first control message based on the identified RNTI.

Figure 7:
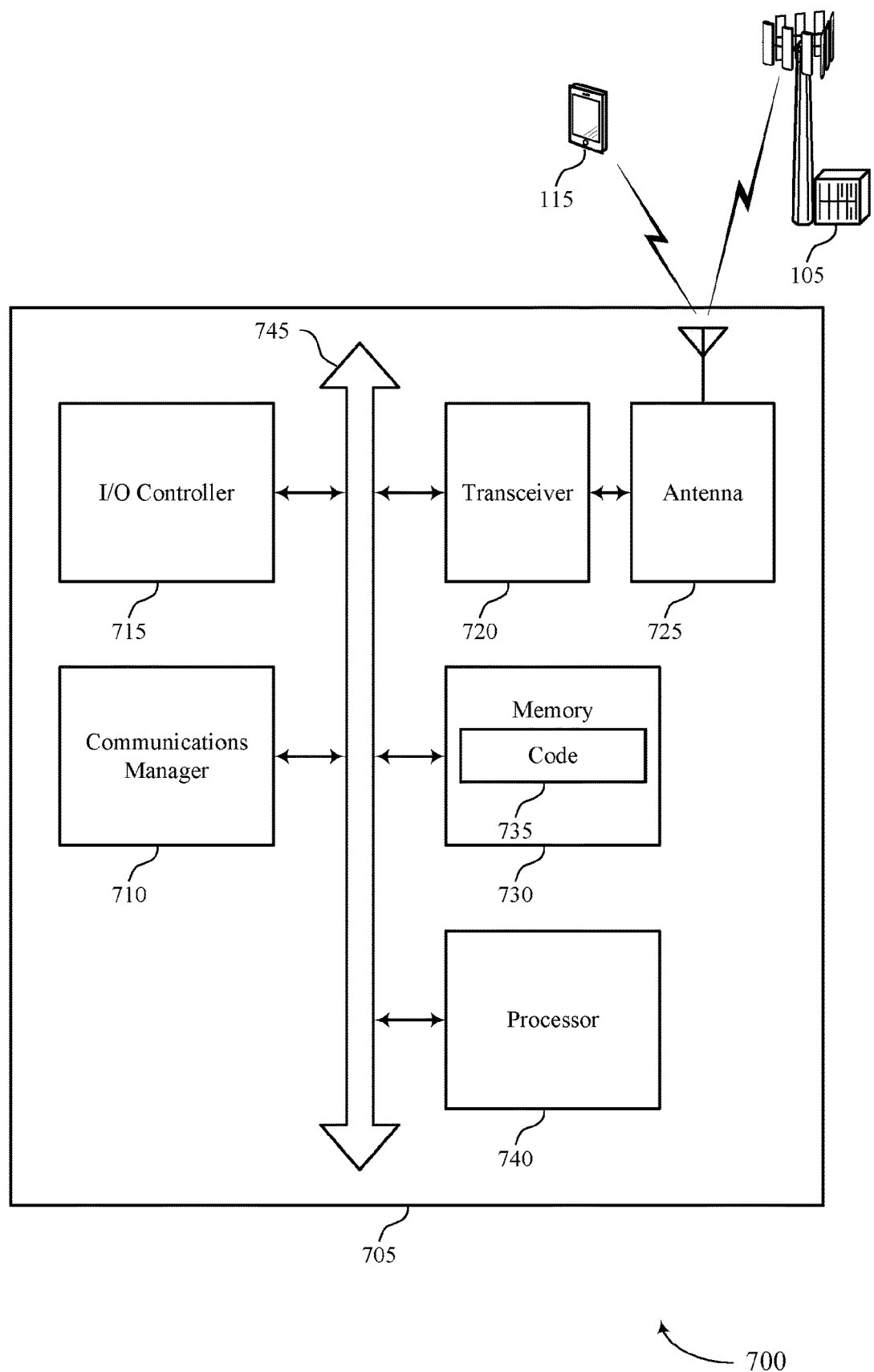
FIG. 7 shows a diagram of a system including a device that supports access network and sidelink joint scheduling in accordance with aspects of the present disclosure.

FIG. 7 shows a diagram of a system 700 including a device 705 that supports access network and sidelink joint scheduling in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive at least one control message from a base station, the at least one control message jointly scheduling the first UE for access network communications between the first UE and the base station and for sidelink communications between the first UE and at least a second UE, determine network control information associated with the access network communications based on the at least one control message, determine sidelink control information associated with the sidelink communications based on the at least one control message, and communicate with the base station and the second UE in accordance with the network control information and the sidelink control information, respectively.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting access network and sidelink joint scheduling).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
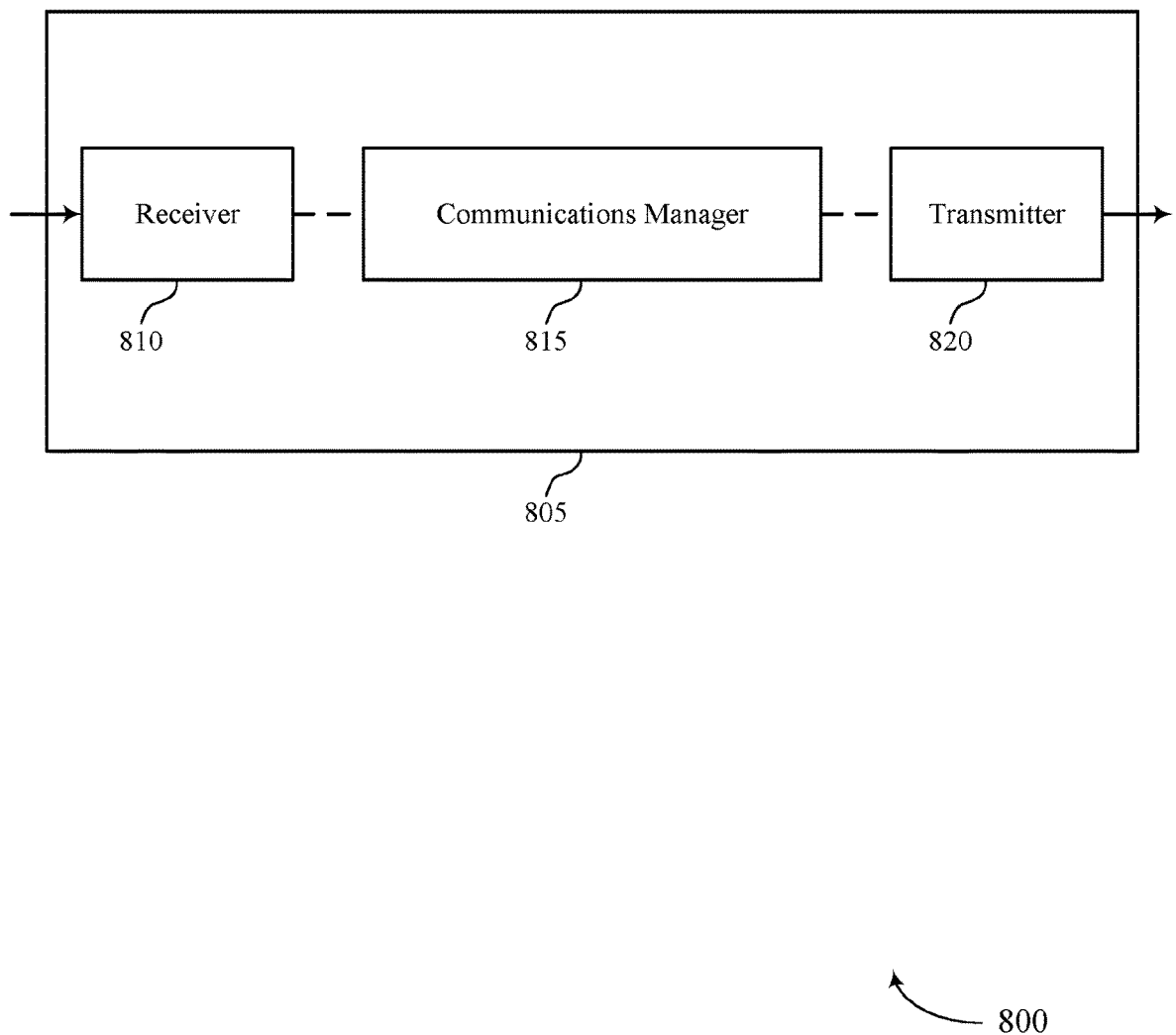
FIGS. 8 and 9 show block diagrams of devices that support access network and sidelink joint scheduling in accordance with aspects of the present disclosure.

FIG. 8 shows a block diagram 800 of a device 805 that supports access network and sidelink joint scheduling in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to access network and sidelink joint scheduling, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify network control information associated with access network communications between the base station and a first UE, identify sidelink control information associated with sidelink communications between the first UE and at least a second UE, and transmit at least one control message to jointly schedule the first UE for the access network communications and the sidelink communications, where the at least one control message includes the network control information and the sidelink control information. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
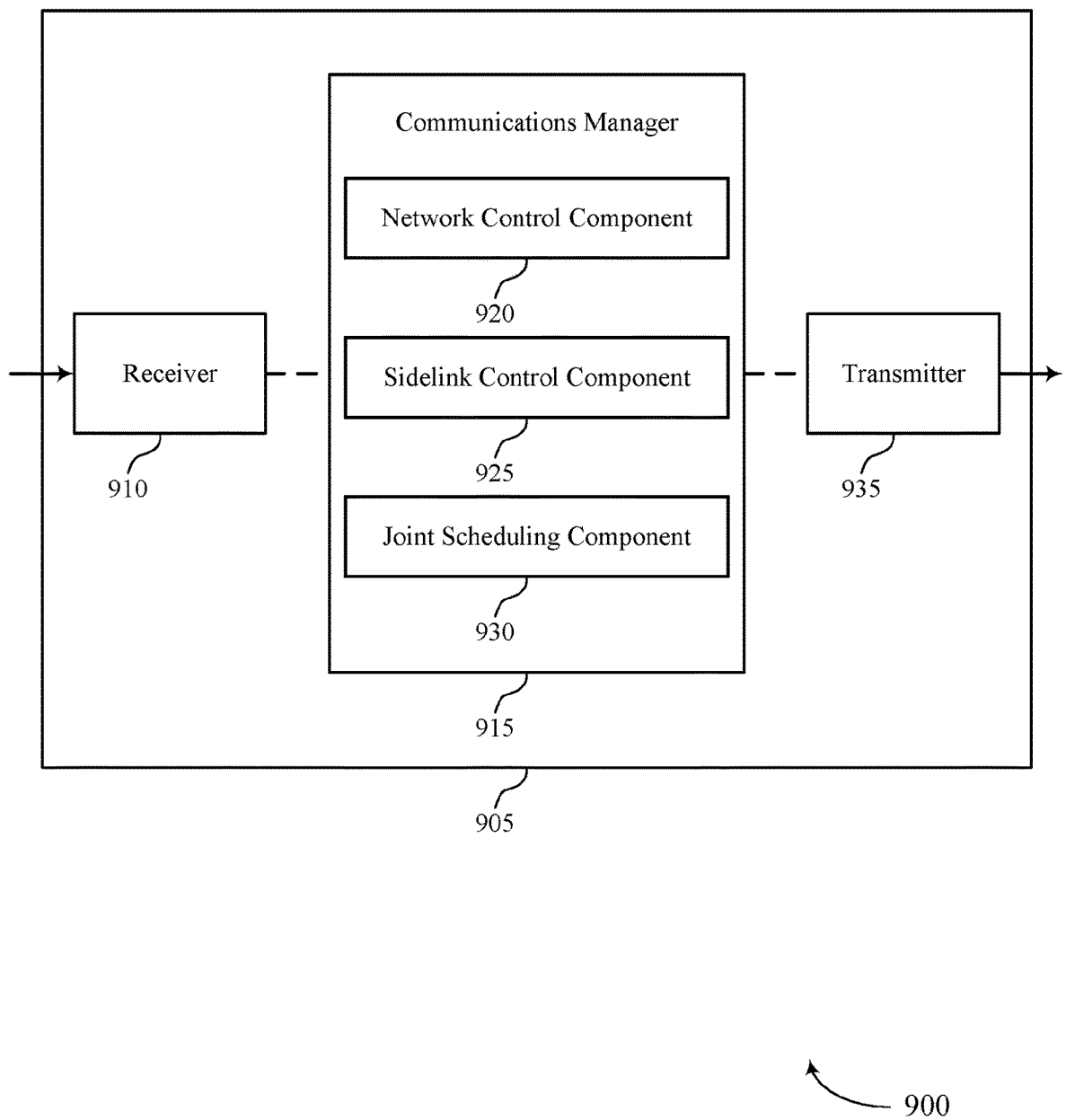

FIG. 9 shows a block diagram 900 of a device 905 that supports access network and sidelink joint scheduling in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to access network and sidelink joint scheduling, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a network control component 920, a sidelink control component 925, and a joint scheduling component 930. The communications manager 915 may be an example of aspects of the communications manager 1110 described herein.

The network control component 920 may identify network control information associated with access network communications between the base station and a first UE.

The sidelink control component 925 may identify sidelink control information associated with sidelink communications between the first UE and at least a second UE.

The joint scheduling component 930 may transmit at least one control message to jointly schedule the first UE for the access network communications and the sidelink communications, where the at least one control message includes the network control information and the sidelink control information.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
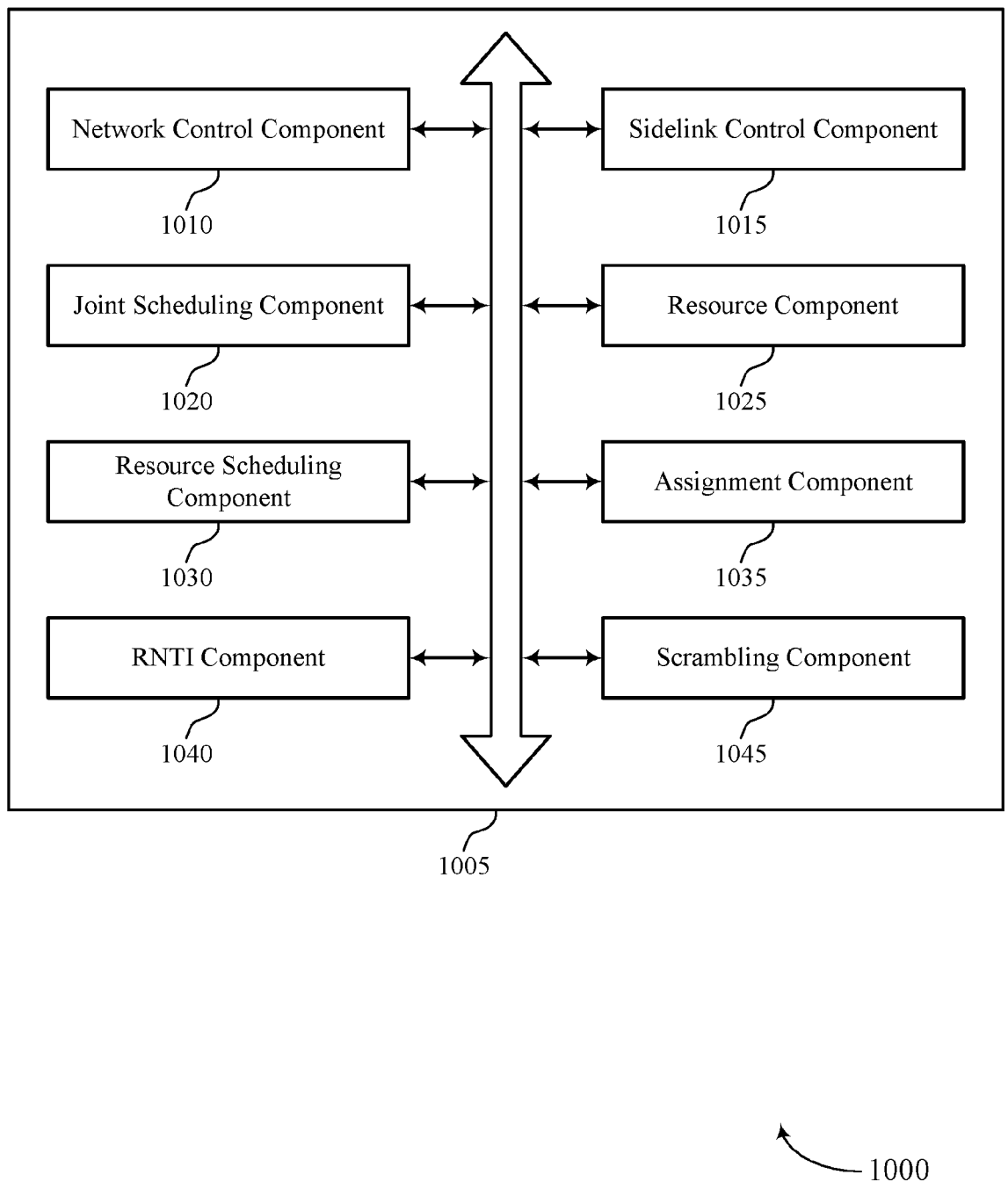
FIG. 10 shows a block diagram of a communications manager that supports access network and sidelink joint scheduling in accordance with aspects of the present disclosure.

FIG. 10 shows a block diagram 1000 of a communications manager 1005 that supports access network and sidelink joint scheduling in accordance with aspects of the present disclosure. The communications manager 1005 may be an example of aspects of a communications manager 815, a communications manager 915, or a communications manager 1110 described herein. The communications manager 1005 may include a network control component 1010, a sidelink control component 1015, a joint scheduling component 1020, a resource component 1025, a resource scheduling component 1030, an assignment component 1035, an RNTI component 1040, and a scrambling component 1045. Each of these modules may communicate, directly or indirectly, with one another (e.g., via one or more buses).

The network control component 1010 may identify network control information associated with access network communications between the base station and a first UE.

The sidelink control component 1015 may identify sidelink control information associated with sidelink communications between the first UE and at least a second UE. In some cases, the sidelink control information includes one or more sidelink parameters for the sidelink communications between the first UE and the second UE, the one or more sidelink parameters including a transmission power parameter, an MCS, an NDI, HARQ parameters, a DAI, a resource assignment expiration timer, or a combination thereof. In some cases, the sidelink control information includes a group identifier of a group of UEs including the first UE and the second UE, a sidelink RNTI for groupcast communications within the group of UEs, or a combination thereof.

The joint scheduling component 1020 may transmit at least one control message to jointly schedule the first UE for the access network communications and the sidelink communications, where the at least one control message includes the network control information and the sidelink control information. In some examples, the joint scheduling component 1020 may transmit the sidelink control information and the network control information in separate but linked messages. In some examples, the joint scheduling component 1020 may transmit the sidelink control information and the network control information in a same control message. In some examples, the joint scheduling component 1020 may transmit a first control message to the first UE, the first control message including the network control information and an indication that the sidelink control information is to be transmitted via a second message. In some examples, the joint scheduling component 1020 may transmit the second message to the first UE, the second message including the sidelink control information. In some examples, the joint scheduling component 1020 may transmit an indication of one or more resources associated with the sidelink communications, the one or more resources including a sidelink control channel, a sidelink shared channel, a feedback channel, or any combination thereof. In some examples, the joint scheduling component 1020 may transmit a first control message to the first UE, the first control message including the network control information and the sidelink control information. In some examples, the joint scheduling component 1020 may perform dynamic scheduling, SPS, one time scheduling, or a combination thereof for the access network communications, the sidelink communications, or both. In some cases, the first control message includes DCI associated with a downlink grant for the first UE and the second message includes a RRC message associated with a sidelink grant for the first UE, the second UE, or both, the RRC message piggybacked on a data message scheduled by the DCI. In some cases, the feedback channel is associated with uplink feedback, the uplink feedback including HARQ communications with the first UE, CSI report transmissions from the first UE, or a combination thereof, where the uplink feedback is decoded based on uplink control information. In some cases, a first resource of the one or more resources includes resources for both the sidelink control channel and the sidelink shared channel. In some cases, a first resource of the one or more resources includes resources for the sidelink control channel and a second resource of the one or more resources includes resources for the sidelink shared channel. In some cases, the sidelink control channel indicates a resource assigned to the feedback channel, the feedback channel is configured with a feedback resource pool, or a combination thereof. In some cases, the first control message includes DCI associated with an integrated grant for the first UE, the integrated grant including one or more fields corresponding to a sidelink grant and a downlink grant or an uplink grant. In some cases, the first control message includes an indication that the integrated grant is included in the DCI. In some cases, the first control message includes an indication of one or more BWPs for the access network communications, the sidelink communications, or both.

The resource component 1025 may determine one or more sidelink resources for the first UE, the second UE, or both, the one or more sidelink resources including a transmission resource, a reception resource, or both, where the sidelink control information includes an indication of the one or more sidelink resources. In some cases, the one or more sidelink resources include a resource pool for the sidelink communications.

The resource scheduling component 1030 may schedule the one or more sidelink resources for the first UE, where the at least one control message indicates the one or more sidelink resources.

The assignment component 1035 may assign a resource or a resource pool for the sidelink communications to each UE of a group of UEs, the group of UEs including the first UE and the second UE.

The RNTI component 1040 may identify a radio network temporary identifier (RNTI) corresponding to a first control message of the at least one control message, where the first control message includes DCI and the RNTI is associated with joint scheduling of access network communications and sidelink communications.

The scrambling component 1045 may scramble a CRC code of the first control message based on the identified RNTI.

Figure 11:
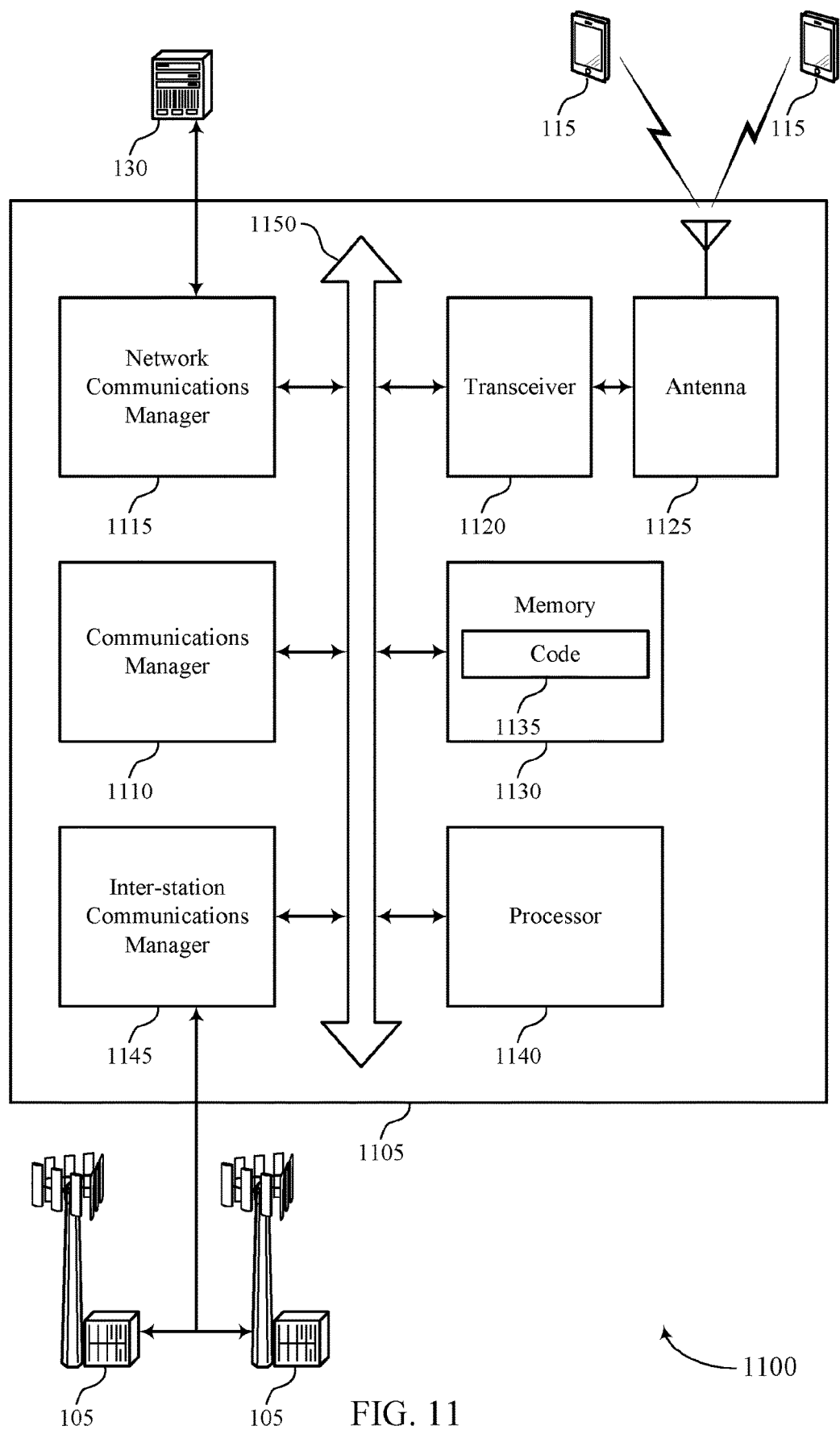
FIG. 11 shows a diagram of a system including a device that supports access network and sidelink joint scheduling in accordance with aspects of the present disclosure.

FIG. 11 shows a diagram of a system 1100 including a device 1105 that supports access network and sidelink joint scheduling in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify network control information associated with access network communications between the base station and a first UE, identify sidelink control information associated with sidelink communications between the first UE and at least a second UE, and transmit at least one control message to jointly schedule the first UE for the access network communications and the sidelink communications, where the at least one control message includes the network control information and the sidelink control information.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting access network and sidelink joint scheduling).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
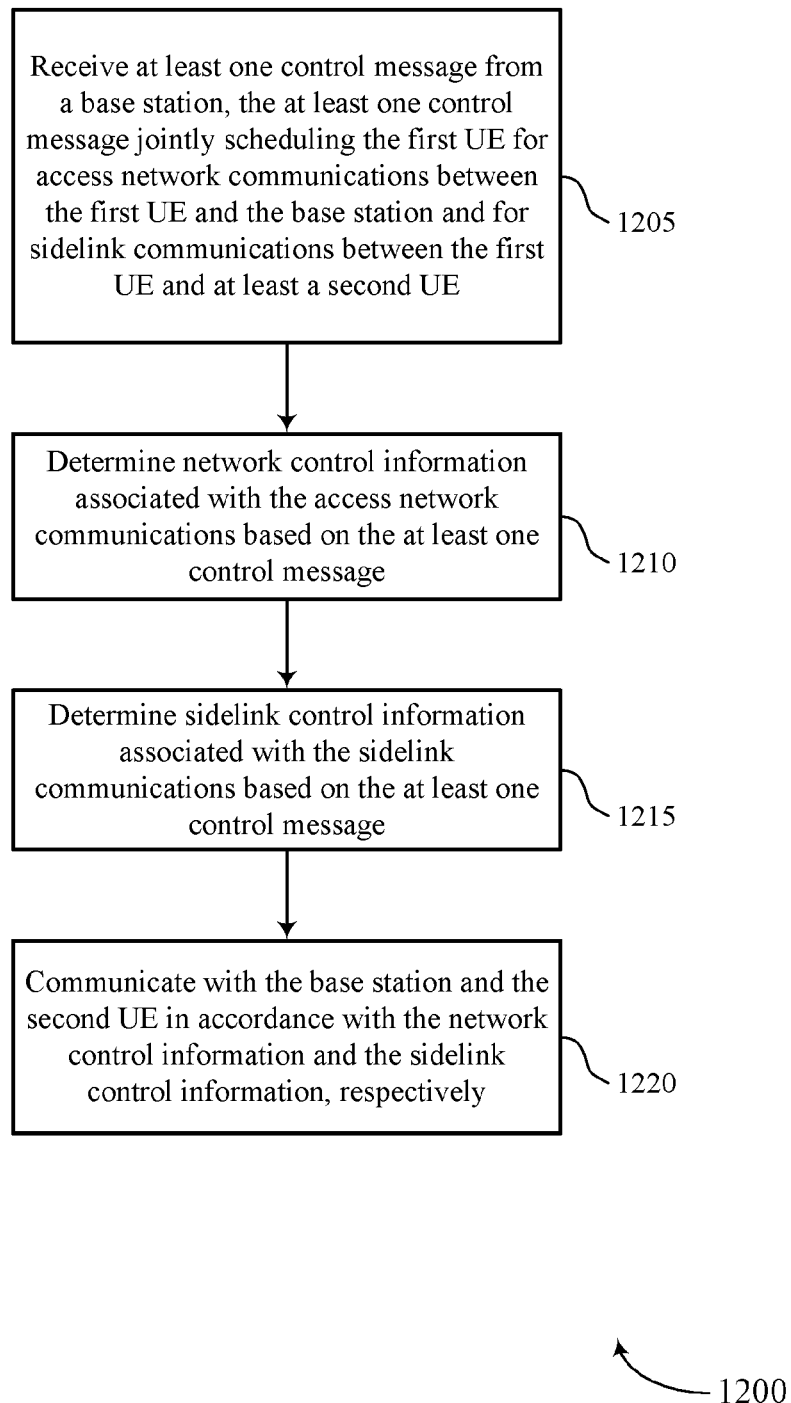
FIGS. 12 through 17 show flowcharts illustrating methods that support access network and sidelink joint scheduling in accordance with aspects of the present disclosure.

FIG. 12 shows a flowchart illustrating a method 1200 that supports access network and sidelink joint scheduling in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive at least one control message from a base station, the at least one control message jointly scheduling the first UE for access network communications between the first UE and the base station and for sidelink communications between the first UE and at least a second UE. The operations of 1205 may be performed according to the methods described herein. In some examples, aspects of the operations of 1205 may be performed by a message component as described with reference to FIGS. 4 through 7.

At 1210, the UE may determine network control information associated with the access network communications based on the at least one control message. The operations of 1210 may be performed according to the methods described herein. In some examples, aspects of the operations of 1210 may be performed by a control information component as described with reference to FIGS. 4 through 7.

At 1215, the UE may determine sidelink control information associated with the sidelink communications based on the at least one control message. The operations of 1215 may be performed according to the methods described herein. In some examples, aspects of the operations of 1215 may be performed by a control information component as described with reference to FIGS. 4 through 7.

At 1220, the UE may communicate with the base station and the second UE in accordance with the network control information and the sidelink control information, respectively. The operations of 1220 may be performed according to the methods described herein. In some examples, aspects of the operations of 1220 may be performed by a communication component as described with reference to FIGS. 4 through 7.

Figure 13:
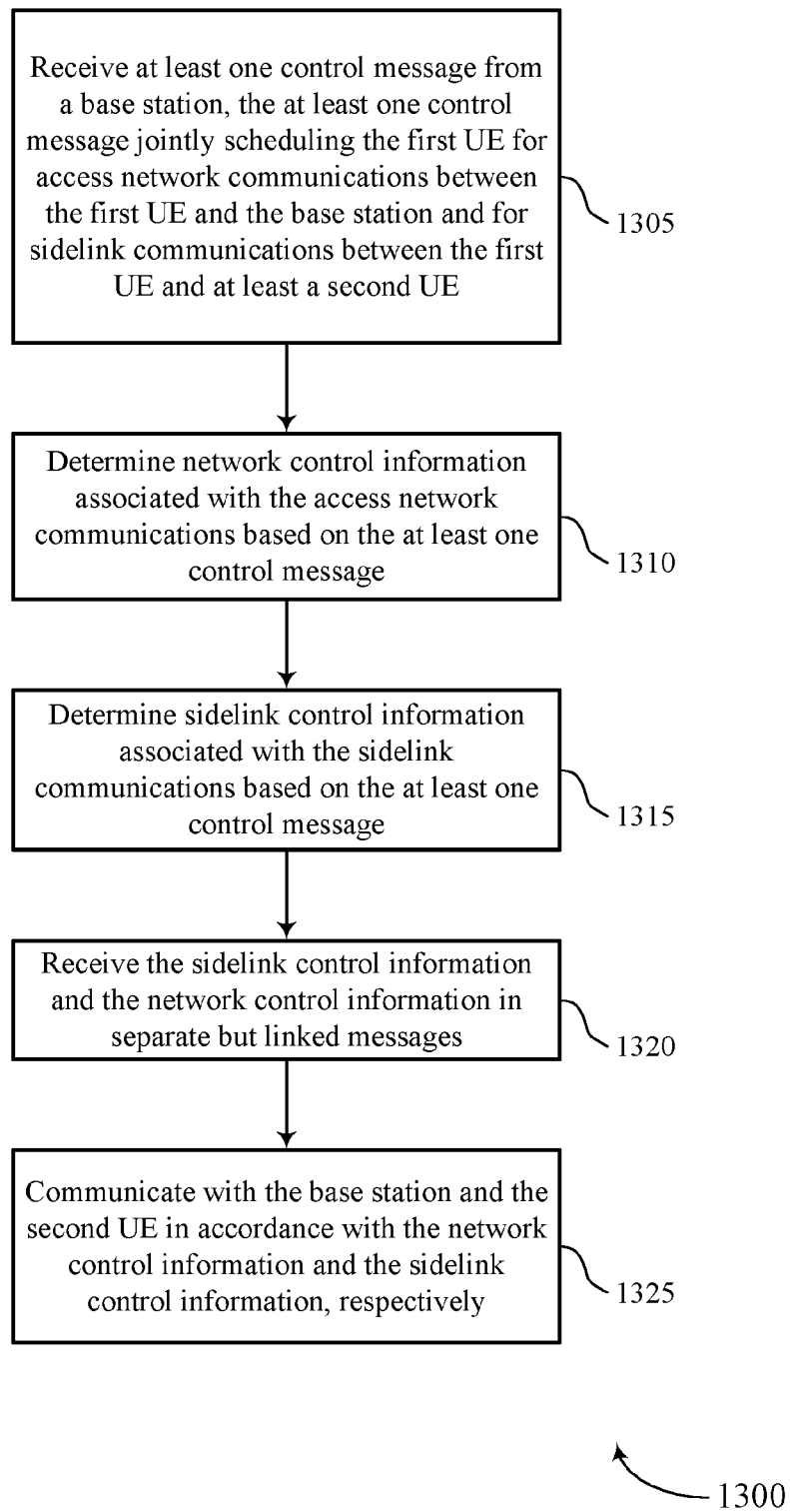

FIG. 13 shows a flowchart illustrating a method 1300 that supports access network and sidelink joint scheduling in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive at least one control message from a base station, the at least one control message jointly scheduling the first UE for access network communications between the first UE and the base station and for sidelink communications between the first UE and at least a second UE. The operations of 1305 may be performed according to the methods described herein. In some examples, aspects of the operations of 1305 may be performed by a message component as described with reference to FIGS. 4 through 7.

At 1310, the UE may determine network control information associated with the access network communications based on the at least one control message. The operations of 1310 may be performed according to the methods described herein. In some examples, aspects of the operations of 1310 may be performed by a control information component as described with reference to FIGS. 4 through 7.

At 1315, the UE may determine sidelink control information associated with the sidelink communications based on the at least one control message. The operations of 1315 may be performed according to the methods described herein. In some examples, aspects of the operations of 1315 may be performed by a control information component as described with reference to FIGS. 4 through 7.

At 1320, the UE may receive the sidelink control information and the network control information in separate but linked messages (e.g., the at least one control message may include separate but linked messages). The operations of 1320 may be performed according to the methods described herein. In some examples, aspects of the operations of 1320 may be performed by a control information component as described with reference to FIGS. 4 through 7.

At 1325, the UE may communicate with the base station and the second UE in accordance with the network control information and the sidelink control information, respectively. The operations of 1325 may be performed according to the methods described herein. In some examples, aspects of the operations of 1325 may be performed by a communication component as described with reference to FIGS. 4 through 7.

Figure 14:
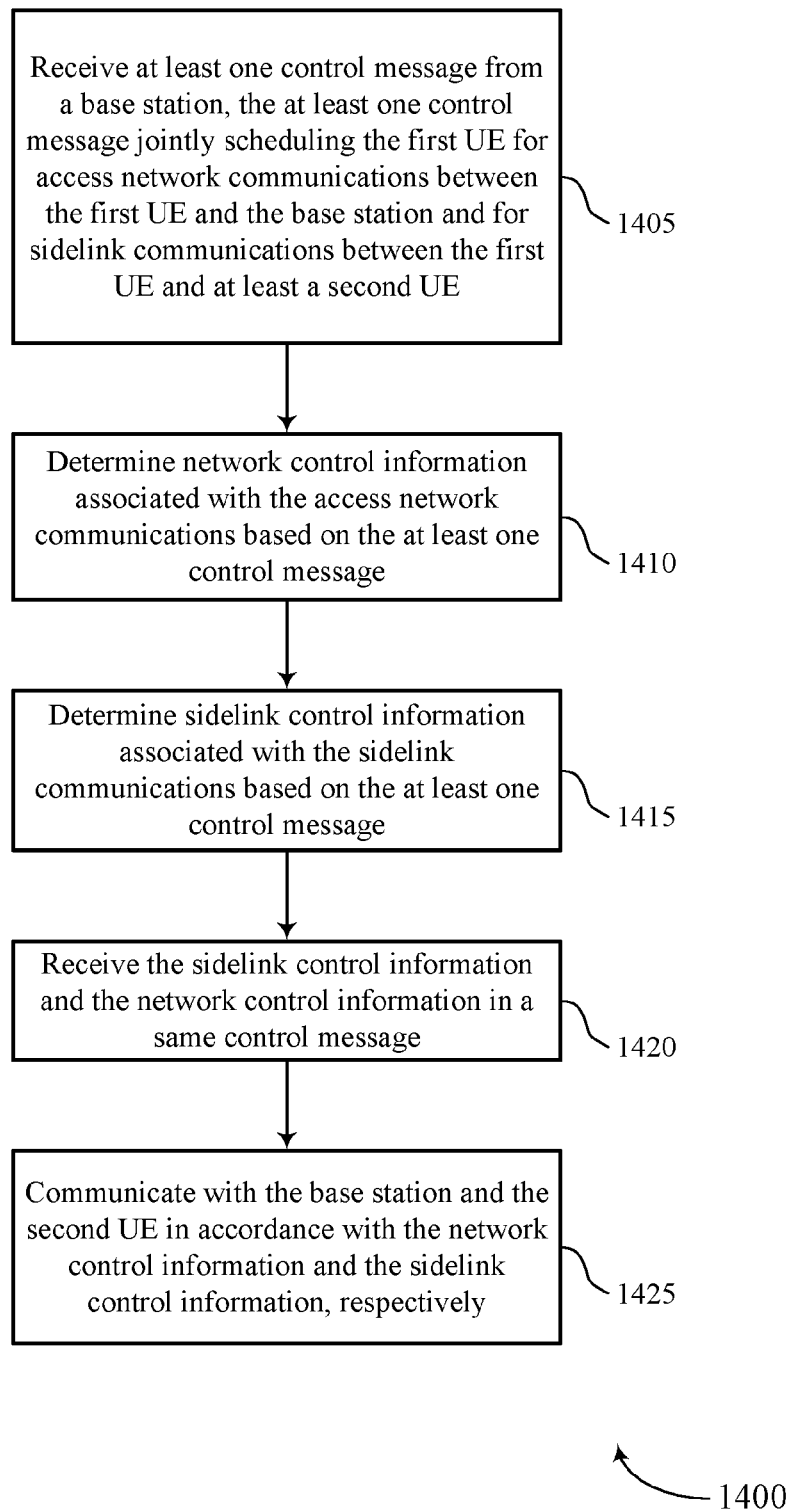

FIG. 14 shows a flowchart illustrating a method 1400 that supports access network and sidelink joint scheduling in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive at least one control message from a base station, the at least one control message jointly scheduling the first UE for access network communications between the first UE and the base station and for sidelink communications between the first UE and at least a second UE. The operations of 1405 may be performed according to the methods described herein. In some examples, aspects of the operations of 1405 may be performed by a message component as described with reference to FIGS. 4 through 7.

At 1410, the UE may determine network control information associated with the access network communications based on the at least one control message. The operations of 1410 may be performed according to the methods described herein. In some examples, aspects of the operations of 1410 may be performed by a control information component as described with reference to FIGS. 4 through 7.

At 1415, the UE may determine sidelink control information associated with the sidelink communications based on the at least one control message. The operations of 1415 may be performed according to the methods described herein. In some examples, aspects of the operations of 1415 may be performed by a control information component as described with reference to FIGS. 4 through 7.

At 1420, the UE may receive the sidelink control information and the network control information in a same control message (e.g., the at least one control message may include the same control message). The operations of 1420 may be performed according to the methods described herein. In some examples, aspects of the operations of 1420 may be performed by a control information component as described with reference to FIGS. 4 through 7.

At 1425, the UE may communicate with the base station and the second UE in accordance with the network control information and the sidelink control information, respectively. The operations of 1425 may be performed according to the methods described herein. In some examples, aspects of the operations of 1425 may be performed by a communication component as described with reference to FIGS. 4 through 7.

Figure 15:
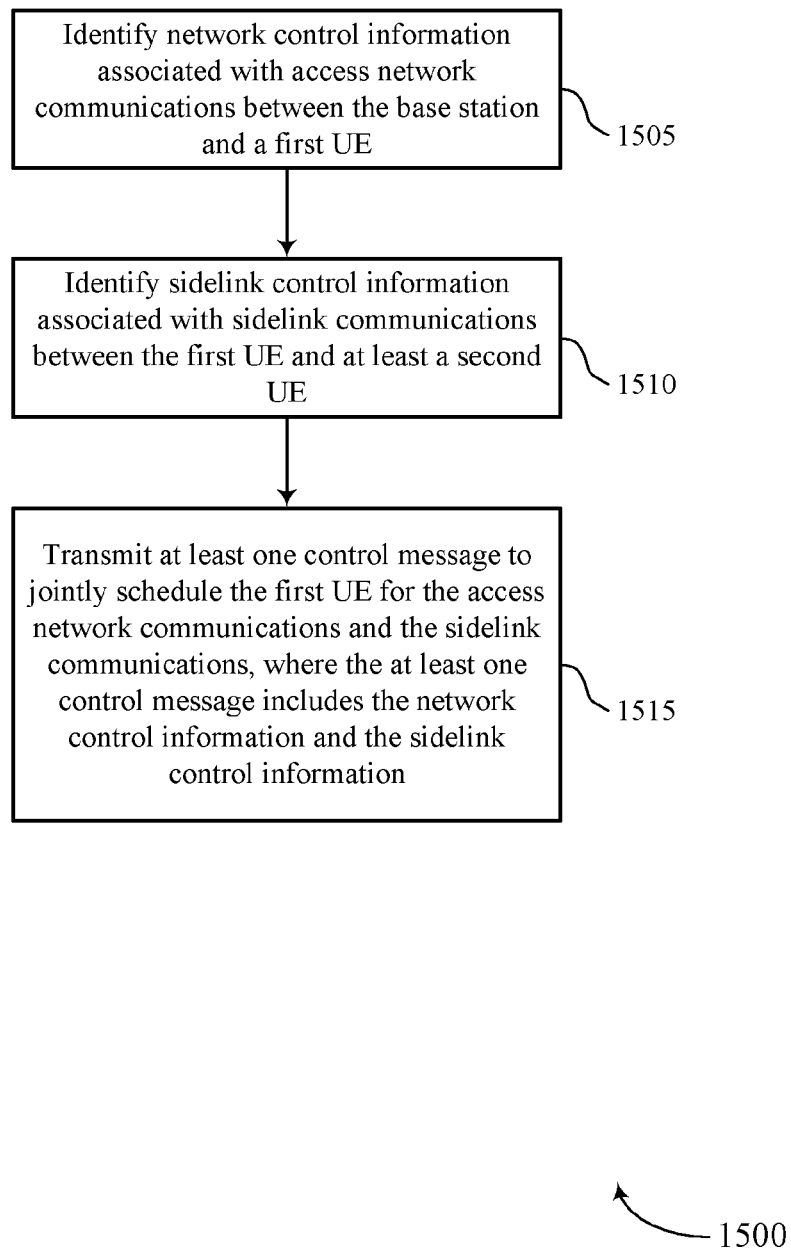

FIG. 15 shows a flowchart illustrating a method 1500 that supports access network and sidelink joint scheduling in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may identify network control information associated with access network communications between the base station and a first UE. The operations of 1505 may be performed according to the methods described herein. In some examples, aspects of the operations of 1505 may be performed by a network control component as described with reference to FIGS. 8 through 11.

At 1510, the base station may identify sidelink control information associated with sidelink communications between the first UE and at least a second UE. The operations of 1510 may be performed according to the methods described herein. In some examples, aspects of the operations of 1510 may be performed by a sidelink control component as described with reference to FIGS. 8 through 11.

At 1515, the base station may transmit at least one control message to jointly schedule the first UE for the access network communications and the sidelink communications, where the at least one control message includes the network control information and the sidelink control information. The operations of 1515 may be performed according to the methods described herein. In some examples, aspects of the operations of 1515 may be performed by a joint scheduling component as described with reference to FIGS. 8 through 11.

Figure 16:
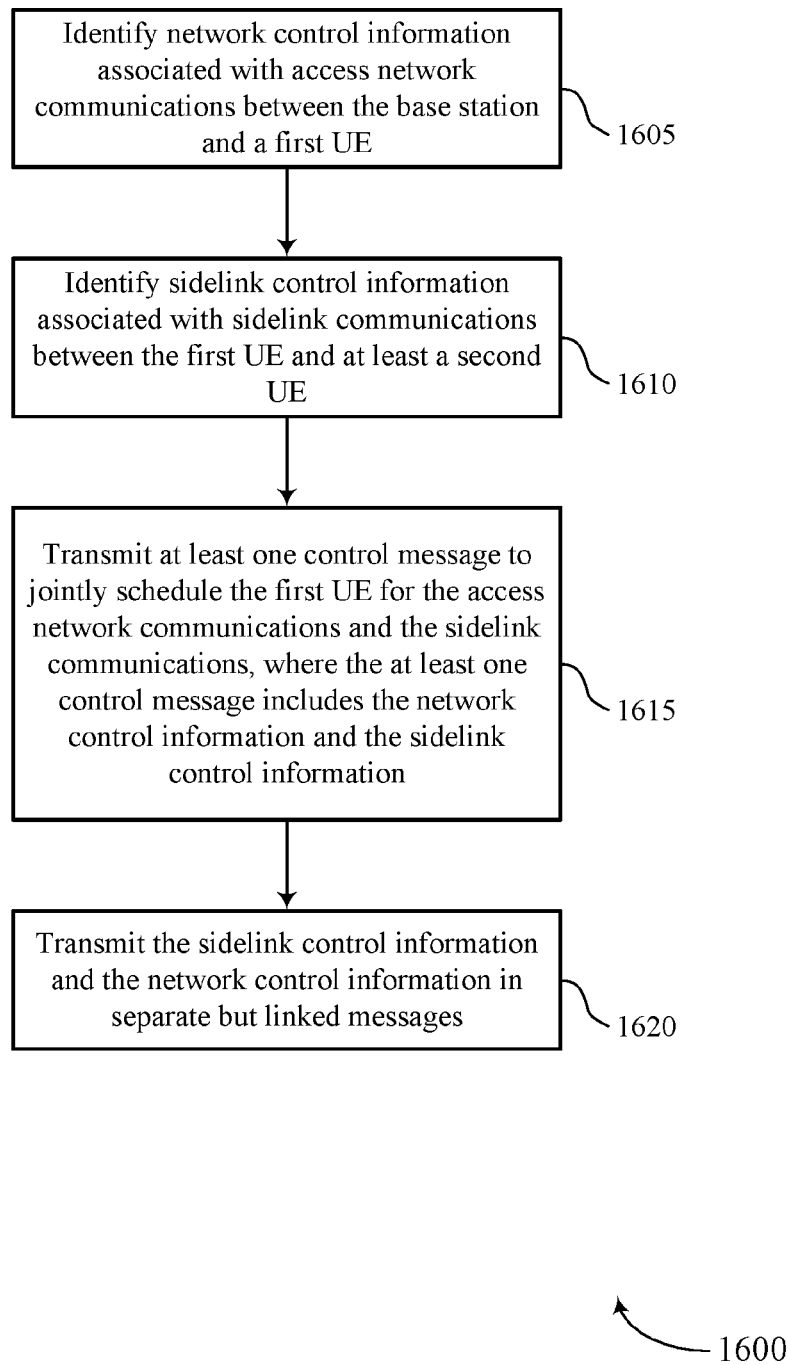

FIG. 16 shows a flowchart illustrating a method 1600 that supports access network and sidelink joint scheduling in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may identify network control information associated with access network communications between the base station and a first UE. The operations of 1605 may be performed according to the methods described herein. In some examples, aspects of the operations of 1605 may be performed by a network control component as described with reference to FIGS. 8 through 11.

At 1610, the base station may identify sidelink control information associated with sidelink communications between the first UE and at least a second UE. The operations of 1610 may be performed according to the methods described herein. In some examples, aspects of the operations of 1610 may be performed by a sidelink control component as described with reference to FIGS. 8 through 11.

At 1615, the base station may transmit at least one control message to jointly schedule the first UE for the access network communications and the sidelink communications, where the at least one control message includes the network control information and the sidelink control information. The operations of 1615 may be performed according to the methods described herein. In some examples, aspects of the operations of 1615 may be performed by a joint scheduling component as described with reference to FIGS. 8 through 11.

At 1620, the base station may transmit the sidelink control information and the network control information in separate but linked messages. The operations of 1620 may be performed according to the methods described herein. In some examples, aspects of the operations of 1620 may be performed by a joint scheduling component as described with reference to FIGS. 8 through 11.

Figure 17:
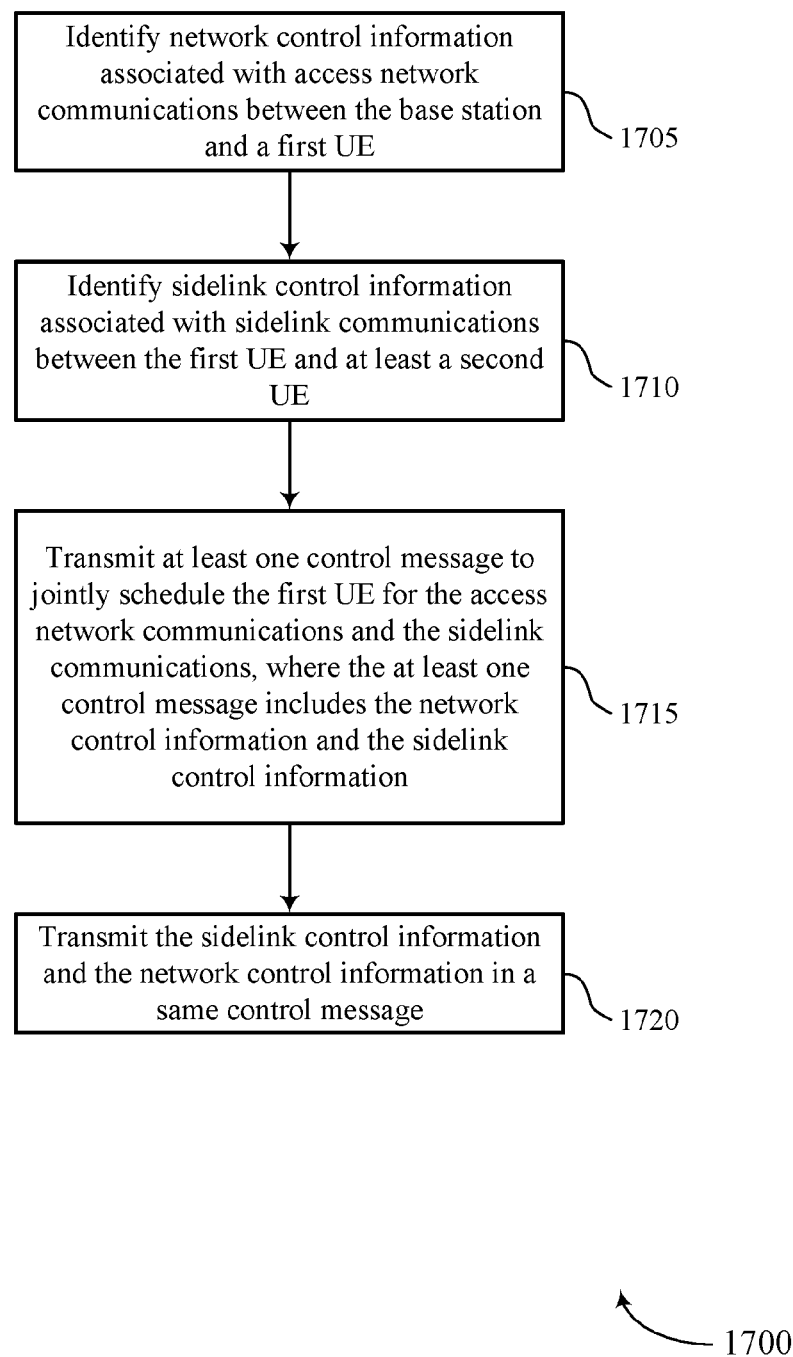

FIG. 17 shows a flowchart illustrating a method 1700 that supports access network and sidelink joint scheduling in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may identify network control information associated with access network communications between the base station and a first UE. The operations of 1705 may be performed according to the methods described herein. In some examples, aspects of the operations of 1705 may be performed by a network control component as described with reference to FIGS. 8 through 11.

At 1710, the base station may identify sidelink control information associated with sidelink communications between the first UE and at least a second UE. The operations of 1710 may be performed according to the methods described herein. In some examples, aspects of the operations of 1710 may be performed by a sidelink control component as described with reference to FIGS. 8 through 11.

At 1715, the base station may transmit at least one control message to jointly schedule the first UE for the access network communications and the sidelink communications, where the at least one control message includes the network control information and the sidelink control information. The operations of 1715 may be performed according to the methods described herein. In some examples, aspects of the operations of 1715 may be performed by a joint scheduling component as described with reference to FIGS. 8 through 11.

At 1720, the base station may transmit the sidelink control information and the network control information in a same control message. The operations of 1720 may be performed according to the methods described herein. In some examples, aspects of the operations of 1720 may be performed by a joint scheduling component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Example 1: A method for wireless communications at a first UE, comprising: receiving at least one control message from a base station, the at least one control message jointly scheduling the first UE for access network communications between the first UE and the base station and for sidelink communications between the first UE and at least a second UE; determining network control information associated with the access network communications based on the at least one control message; determining sidelink control information associated with the sidelink communications based on the at least one control message; and communicating with the base station and the second UE in accordance with the network control information and the sidelink control information, respectively.

Example 2: The method of example 1, wherein determining the sidelink control information comprises: receiving the sidelink control information and the network control information in separate but linked messages.

Example 3: The method of example 1, wherein determining the sidelink control information comprises: receiving the sidelink control information and the network control information in a same control message.

Example 4: The method of any of examples 1 to 3, wherein receiving the at least one control message further comprises: receiving a first control message from the base station, the first control message comprising the network control information and an indication that the sidelink control information is to be received via a second message; and receiving the second message from the base station, the second message comprising the sidelink control information.

Example 5: The method of any of examples 1 to 4, wherein the first control message comprises DCI associated with a downlink grant for the first UE and the second message comprises a RRC message associated with a sidelink grant for the first UE and piggybacked on a data message scheduled by the DCI.

Example 6: The method of any of examples 1 to 5, wherein receiving the second message from the base station comprises: receiving an indication of one or more resources associated with the sidelink communications, the one or more resources comprising a sidelink control channel, a sidelink shared channel, a feedback channel, or any combination thereof.

Example 7: The method of any of examples 1 to 6, wherein the feedback channel is associated with uplink feedback, the uplink feedback comprising ARQ communications with the base station, CSI report transmissions to the base station, or a combination thereof, wherein the uplink feedback is coded based at least in part on uplink control information received from the base station.

Example 8: The method of any of examples 1 to 7, wherein a first resource of the one or more resources comprises resources for both the sidelink control channel and the sidelink shared channel.

Example 9: The method of any of examples 1 to 8, wherein a first resource of the one or more resources comprises resources for the sidelink control channel and a second resource of the one or more resources comprises resources for the sidelink shared channel.

Example 10: The method of any of examples 1 to 9, further comprising: receiving an indication of a resource assigned to the feedback channel, a resource pool configured for the feedback channel, or a combination thereof.

Example 11: The method of any of examples 1 to 10, wherein receiving the at least one control message further comprises: receiving a first control message from the base station, the first control message comprising the network control information and the sidelink control information.

Example 12: The method of any of examples 1 to 11, wherein the first control message comprises DCI associated with an integrated grant for the first UE, the integrated grant comprising one or more fields corresponding to a sidelink grant and a downlink grant or an uplink grant.

Example 13: The method of any of examples 1 to 12, wherein the first control message comprises an indication that the integrated grant is included in the DCI.

Example 14: The method of any of examples 1 to 13, wherein the first control message comprises an indication of one or more BWPs for the access network communications, the sidelink communications, or both.

Example 15: The method of any of examples 1 to 14, further comprising: determining one or more sidelink resources for the sidelink communications based at least in part on the received sidelink control information, the one or more sidelink resources comprising a transmission resource, a reception resource, or both.

Example 16: The method of any of examples 1 to 15, wherein the one or more sidelink resources comprise a resource pool for the sidelink communications.

Example 17: The method of any of examples 1 to 16, wherein the one or more sidelink resources are assigned to the first UE for the sidelink communications.

Example 18: The method of any of examples 1 to 17, wherein the sidelink control information comprises one or more sidelink parameters for the sidelink communications between the first UE and the second UE, the one or more sidelink parameters comprising a transmission power parameter, a MCS, an NDI, HARQ parameters, a DAI, a resource assignment expiration timer, or a combination thereof.

Example 19: The method of any of examples 1 to 18, wherein the sidelink control information comprises a group identifier of a group of UEs comprising the first UE and the second UE, a sidelink RNTI for groupcast communications within the group of UEs, or a combination thereof.

Example 20: The method of any of examples 1 to 19, further comprising: identifying a RNTI corresponding to a first control message of the at least one control message, wherein the first control message comprises DCI and the RNTI is associated with joint scheduling of access network communications and sidelink communications; and descrambling CRC code of the first control message based at least in part on the identified RNTI.

Example 21: An apparatus comprising at least one means for performing a method of any of examples 1 to 20.

Example 22: An apparatus for wireless communications comprising a processor; memory coupled with the processor; and instructions stored in the memory and executable by the processor to cause the apparatus to perform a method of any of examples 1 to 20.

Example 23: A non-transitory computer-readable medium storing code for wireless communications, the code comprising instructions executable by a processor to perform a method of any of examples 1 to 20.

Example 24: A method for wireless communications at a base station, comprising: identifying network control information associated with access network communications between the base station and a first UE; identifying sidelink control information associated with sidelink communications between the first UE and at least a second UE; and transmitting at least one control message to jointly schedule the first UE for the access network communications and the sidelink communications, wherein the at least one control message comprises the network control information and the sidelink control information.

Example 25: The method of example 24, wherein transmitting the at least one control message comprises: transmitting the sidelink control information and the network control information in separate but linked messages.

Example 26: The method of example 24, wherein transmitting the at least one control message comprises: transmitting the sidelink control information and the network control information in a same control message.

Example 27: The method of any of examples 24 to 26, wherein transmitting the at least one control message further comprises: transmitting a first control message to the first UE, the first control message comprising the network control information and an indication that the sidelink control information is to be transmitted via a second message; and transmitting the second message to the first UE, the second message comprising the sidelink control information.

Example 28: The method of any of examples 24 to 27, wherein the first control message comprises DCI associated with a downlink grant for the first UE and the second message comprises a RRC message associated with a sidelink grant for the first UE and piggybacked on a data message scheduled by the DCI.

Example 29: The method of any of examples 24 to 28, wherein transmitting the second message comprises: transmitting an indication of one or more resources associated with the sidelink communications, the one or more resources comprising a sidelink control channel, a sidelink shared channel, a feedback channel, or any combination thereof.

Example 30: The method of any of examples 24 to 29, wherein the feedback channel is associated with uplink feedback, the uplink feedback comprising ARQ communications with the first UE, CSI report transmissions from the first UE, or a combination thereof, wherein the uplink feedback is decoded based at least in part on uplink control information.

Example 31: The method of any of examples 24 to 30, wherein a first resource of the one or more resources comprises resources for both the sidelink control channel and the sidelink shared channel.

Example 32: The method of any of examples 24 to 31, wherein a first resource of the one or more resources comprises resources for the sidelink control channel and a second resource of the one or more resources comprises resources for the sidelink shared channel; and/or wherein the sidelink control channel indicates a resource assigned to the feedback channel, the feedback channel is configured with a feedback resource pool, or a combination thereof.

Example 33: The method of any of examples 24 to 32, wherein transmitting the at least one control message further comprises: transmitting a first control message to the first UE, the first control message comprising the network control information and the sidelink control information.

Example 34: The method of any of examples 24 to 33, wherein the first control message comprises DCI associated with an integrated grant for the first UE, the integrated grant comprising one or more fields corresponding to a sidelink grant and a downlink grant or an uplink grant.

Example 35: The method of any of examples 24 to 34, wherein the first control message comprises an indication that the integrated grant is included in the DCI.

Example 36: The method of any of examples 24 to 35, wherein the first control message comprises an indication of one or more BWPs for the access network communications, the sidelink communications, or both.

Example 37: The method of any of examples 24 to 36, further comprising: determining one or more sidelink resources for the first UE, the second UE, or both, the one or more sidelink resources comprising a transmission resource, a reception resource, or both, wherein the sidelink control information comprises an indication of the one or more sidelink resources.

Example 38: The method of any of examples 24 to 37, wherein the one or more sidelink resources comprise a resource pool for the sidelink communications.

Example 39: The method of any of examples 24 to 38, further comprising: scheduling the one or more sidelink resources for the first UE, wherein the at least one control message indicates the one or more sidelink resources.

Example 40: The method of any of examples 24 to 39, wherein the sidelink control information comprises one or more sidelink parameters for the sidelink communications between the first UE and the second UE, the one or more sidelink parameters comprising a transmission power parameter, a MCS, a NDI, HARQ parameters, a DAI, a resource assignment expiration timer, or a combination thereof.

Example 41: The method of any of examples 24 to 40, wherein the sidelink control information comprises a group identifier of a group of UEs comprising the first UE and the second UE, a RNTI for groupcast communications within the group of UEs, or a combination thereof.

Example 42: The method of any of examples 24 to 41, further comprising: assigning a resource or a resource pool for the sidelink communications to each UE of a group of UEs, the group of UEs comprising the first UE and the second UE.

Example 43: The method of any of examples 24 to 42, further comprising: identifying a RNTI corresponding to a first control message of the at least one control message, wherein the first control message comprises DCI and the RNTI is associated with joint scheduling of access network communications and sidelink communications; and scrambling a CRC code of the first control message based at least in part on the identified RNTI.

Example 44: The method of any of examples 24 to 43, further comprising: performing dynamic scheduling, SPS, one time scheduling, or a combination thereof for the access network communications, the sidelink communications, or both.

Example 45: An apparatus comprising at least one means for performing a method of any of examples 24 to 44.

Example 46: An apparatus for wireless communications comprising a processor; memory coupled with the processor; and instructions stored in the memory and executable by the processor to cause the apparatus to perform a method of any of examples 24 to 44.

Example 47: A non-transitory computer-readable medium storing code for wireless communications, the code comprising instructions executable by a processor to perform a method of any of examples 24 to 44.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving a first control message from a network entity, the first control message jointly scheduling the first UE for access network communications between the first UE and the network entity and for sidelink communications between the first UE and at least a second UE, the first control message comprising an indication that sidelink control information is to be received via a second message;
receiving the second message from the network entity, the second message comprising the sidelink control information;
determining network control information associated with the access network communications based at least in part on the first control message;
determining the sidelink control information associated with the sidelink communications based at least in part on the second message; and
communicating with the network entity and the second UE in accordance with the network control information and the sidelink control information, respectively.

2. The method of claim 1, wherein
the sidelink control information and the network control information are received in separate but linked messages.

3. The method of claim 1, wherein the first control message comprises downlink control information (DCI) associated with a downlink grant for the first UE and the second message comprises a radio resource control (RRC) message associated with a sidelink grant for the first UE and piggybacked on a data message scheduled by the DCI.

4. The method of claim 1, wherein receiving the second message from the network entity comprises:
receiving an indication of one or more resources associated with the sidelink communications, the one or more resources comprising a sidelink control channel, a sidelink shared channel, a feedback channel, or any combination thereof.

5. The method of claim 4, wherein the feedback channel is associated with uplink feedback, the uplink feedback comprising automatic repeat request (ARQ) communications with the network entity, channel state indicator (CSI) report transmissions to the network entity, or a combination thereof, wherein the uplink feedback is coded based at least in part on uplink control information received from the network entity.

6. The method of claim 4, wherein a first resource of the one or more resources comprises resources for both the sidelink control channel and the sidelink shared channel.

7. The method of claim 4, wherein a first resource of the one or more resources comprises resources for the sidelink control channel and a second resource of the one or more resources comprises resources for the sidelink shared channel.

8. The method of claim 4, further comprising:
receiving an indication of a resource assigned to the feedback channel, a resource pool configured for the feedback channel, or a combination thereof.

9. The method of claim 1, further comprising:
determining one or more sidelink resources for the sidelink communications based at least in part on the received sidelink control information, the one or more sidelink resources comprising a transmission resource, a reception resource, or both.

10. The method of claim 9, wherein the one or more sidelink resources comprise a resource pool for the sidelink communications.

11. The method of claim 9, wherein the one or more sidelink resources are assigned to the first UE for the sidelink communications.

12. The method of claim 1, wherein the sidelink control information comprises one or more sidelink parameters for the sidelink communications between the first UE and the second UE, the one or more sidelink parameters comprising a transmission power parameter, a modulation coding scheme (MCS), a new data indicator (NDI), hybrid automatic repeat request (HARQ) parameters, a downlink assignment indicator (DAI), a resource assignment expiration timer, or a combination thereof.

13. The method of claim 1, wherein the sidelink control information comprises a group identifier of a group of UEs comprising the first UE and the second UE, a sidelink radio network temporary identifier (RNTI) for groupcast communications within the group of UEs, or a combination thereof.

14. The method of claim 1, further comprising:
identifying a radio network temporary identifier (RNTI) corresponding to the first control message, wherein the first control message comprises downlink control information (DCI) and the RNTI is associated with joint scheduling of access network communications and sidelink communications; and
descrambling a cyclic redundancy check (CRC) code of the first control message based at least in part on the identified RNTI.

15. A method for wireless communications at a network entity, comprising:
identifying network control information associated with access network communications between the network entity and a first user equipment (UE);
identifying sidelink control information associated with sidelink communications between the first UE and at least a second UE;
transmitting a first control message to jointly schedule the first UE for the access network communications and the sidelink communications, the first control message comprising the network control information and an indication that sidelink control information is to be transmitted via a second message; and
transmitting the second message, the second message comprising the sidelink control information.

16. The method of claim 15, wherein
the sidelink control information and the network control information are transmitted in separate but linked messages.

17. The method of claim 15, further comprising:
assigning a resource or a resource pool for the sidelink communications to each UE of a group of UEs, the group of UEs comprising the first UE and the second UE.

18. The method of claim 15, further comprising:
performing dynamic scheduling, semi-persistent scheduling (SPS), one time scheduling, or a combination thereof for the access network communications, the sidelink communications, or both.

19. An apparatus for wireless communications at a first user equipment (UE), comprising:
one or more processors, memory coupled with the one or more processors; and
instructions stored in the memory and executable by the one or more processors to cause the apparatus to:
receive a first control message from a network entity, the first control message jointly scheduling the first UE for access network communications between the first UE and the network entity and for sidelink communications between the first UE and at least a second UE, the first control message comprising an indication that sidelink control information is to be received via a second message;

receive the second message from the network entity, the second message comprising the sidelink control information;

determine network control information associated with the access network communications based at least in part on the first control message;

determine the sidelink control information associated with the sidelink communications based at least in part on the second message; and communicate with the network entity and the second UE in accordance with the network control information and the sidelink control information, respectively.

20. An apparatus for wireless communications at a network entity, comprising:

one or more processors, memory coupled with the one or more processors; and instructions stored in the memory and executable by the one or more processors to cause the apparatus to:

identify network control information associated with access network communications between the network entity and a first user equipment (UE);

identify sidelink control information associated with sidelink communications between the first UE and at least a second UE; and transmit a first control message to jointly schedule the first UE for the access network communications and the sidelink communications, the first control message comprising the network control information and an indication that sidelink control information is to be transmitted via a second message; and transmit the second message, the second message comprising the sidelink control information.

21. The apparatus of claim 19, wherein the first control message comprises downlink control information (DCI) associated with a downlink grant for the first UE and the second message comprises a radio resource control (RRC) message associated with a sidelink grant for the first UE and piggybacked on a data message scheduled by the DCI.

22. The apparatus of claim 19, wherein the instructions to receive the second message from the network entity is further executable to:

receive an indication of one or more resources associated with the sidelink communications, the one or more resources comprising a sidelink control channel, a sidelink shared channel, a feedback channel, or any combination thereof.

23. The apparatus of claim 22, wherein the feedback channel is associated with uplink feedback, the uplink feedback comprising automatic repeat request (ARQ) communications with the network entity, channel state indicator (CSI) report transmissions to the network entity, or a combination thereof, wherein the uplink feedback is coded based at least in part on uplink control information received from the network entity.

24. The apparatus of claim 22, wherein a first resource of the one or more resources comprises resources for both the sidelink control channel and the sidelink shared channel.

25. The apparatus of claim 22, wherein a first resource of the one or more resources comprises resources for the sidelink control channel and a second resource of the one or more resources comprises resources for the sidelink shared channel.

26. The apparatus of claim 22, wherein the instructions are further executable to:

receive an indication of a resource assigned to the feedback channel, a resource pool configured for the feedback channel, or a combination thereof.

27. The apparatus of claim 20, wherein the first control message comprises downlink control information (DCI) associated with a downlink grant for the first UE and the second message comprises a radio resource control (RRC) message associated with a sidelink grant for the first UE and piggybacked on a data message scheduled by the DCI.

28. The apparatus of claim 20, wherein the instructions to transmit the second message is further executable to:

transmit an indication of one or more resources associated with the sidelink communications, the one or more resources comprising a sidelink control channel, a sidelink shared channel, a feedback channel, or any combination thereof.

29. The apparatus of claim 28, wherein the feedback channel is associated with uplink feedback, the uplink feedback comprising automatic repeat request (ARQ) communications with the UE, channel state indicator (CSI) report transmissions from the UE, or a combination thereof, wherein the uplink feedback is coded based at least in part on uplink control information.

30. The apparatus of claim 28, wherein a first resource of the one or more resources comprises resources for both the sidelink control channel and the sidelink shared channel.

* * * * *